United States Patent
Murata et al.

(10) Patent No.: US 12,454,526 B2
(45) Date of Patent: Oct. 28, 2025

(54) METHOD FOR PRODUCING PYRROLE-IMIDAZOLE (POLY)AMIDE

(71) Applicant: KANEKA CORPORATION, Osaka (JP)

(72) Inventors: Takahiko Murata, Takasago (JP); Shohei Yamamoto, Takasago (JP); Akira Nishiyama, Takasago (JP)

(73) Assignee: KANEKA CORPORATION, Osaka (JP)

( * ) Notice: Subject to any disclaimer, the term of this patent is extended or adjusted under 35 U.S.C. 154(b) by 1036 days.

(21) Appl. No.: 17/442,306

(22) PCT Filed: Mar. 12, 2020

(86) PCT No.: PCT/JP2020/010792
§ 371 (c)(1),
(2) Date: Sep. 23, 2021

(87) PCT Pub. No.: WO2020/195889
PCT Pub. Date: Oct. 1, 2020

(65) Prior Publication Data
US 2022/0153727 A1     May 19, 2022

(30) Foreign Application Priority Data
Mar. 28, 2019   (JP) .................................. 2019-063936

(51) Int. Cl.
*C07D 403/12*   (2006.01)
(52) U.S. Cl.
CPC .................. *C07D 403/12* (2013.01)
(58) Field of Classification Search
CPC ................ C07D 403/12; C07D 207/34; C07D 207/408; C07D 471/04
USPC ........................................................ 548/313.1
See application file for complete search history.

(56) References Cited

U.S. PATENT DOCUMENTS

| | | |
|---|---|---|
| 5,998,140 A | 12/1999 | Dervan et al. |
| 6,087,663 A | 7/2000 | Moisan et al. |
| 6,090,947 A | 7/2000 | Dervan et al. |
| 6,143,901 A | 11/2000 | Dervan |
| 6,303,312 B1 | 10/2001 | Dervan et al. |
| 6,472,537 B1 | 10/2002 | Baird et al. |
| 6,506,906 B1 | 1/2003 | Dervan |

(Continued)

FOREIGN PATENT DOCUMENTS

| | | |
|---|---|---|
| JP | 2000-503324 A | 3/2000 |
| JP | 2012-510512 A | 5/2012 |

OTHER PUBLICATIONS

Condensation Agent for Organic Synthesis, Second Edition, Fujifilm Wako Pure Chemical Corporation, 2018, pp. 1-16.

(Continued)

*Primary Examiner* — Taylor V Oh
(74) *Attorney, Agent, or Firm* — Birch, Stewart, Kolasch & Birch, LLP

(57) ABSTRACT

The purpose of the present invention is to provide a method for producing a pyrrole-imidazole (poly)amide compound with the rapidly improved conversion rates, high yield and high reproducibility in the reaction forming an amide bond between a carboxy group binding to a pyrrole and an amino group binding to an imidazole. A method for producing a pyrrole-imidazole (poly)amide by reacting an aminoimidazole carboxylic acid derivative with a pyrrolecarboxylic acid derivative in the presence of a heterocyclic aromatic compound as a solvent.

6 Claims, 8 Drawing Sheets

(56) References Cited

U.S. PATENT DOCUMENTS

| | | |
|---|---|---|
| 6,545,162 B1 | 4/2003 | Dervan et al. |
| 6,555,692 B1 | 4/2003 | Dervan |
| 6,635,417 B1 | 10/2003 | Dervan |
| 6,660,255 B1 | 12/2003 | Gottesfeld et al. |
| 6,683,189 B1 | 1/2004 | Deryan et al. |
| 6,958,240 B1 | 10/2005 | Baird et al. |
| 7,049,061 B1 | 5/2006 | Baird et al. |
| 7,087,378 B1 | 8/2006 | Baird et al. |
| 2012/0101147 A1 | 4/2012 | Tsai et al. |

OTHER PUBLICATIONS

Fang et al., "Fully Automated Synthesis of DNA-Binding Py-Im Polyamides Using a Triphosgene Coupling Strategy", Organic Letters, 2015, vol. 17, pp. 158-161.
International Search Report, issued in PCT/JP2020/010792, dated Jun. 9, 2020.
Nnadi et al., "Novel K-Ras G12C Switch-II Covalent Binders Destabilize Ras and Accelerate Nucleotide Exchange", Journal of Chemical Information and Modeling, 2018, vol. 58, pp. 464-471.
Su et al., "Highly Efficient Synthesis of DNA-Binding Hairpin Polyamides via the Use of a New Triphosgene Coupling Strategy", Organic Letters, 2009, vol. 11, No. 17, pp. 3910-3913.
Tripathi et al., "Polymer supported carbodiimide strategy for the synthesis of N-acylated derivatives of deoxy- and ribo purinenucleosides using active esters", Bioorganic & Medicinal Chemistry Letters, 2005, vol. 15, pp. 5045-5048.
Wetzler et al., "Facile Dimer Synthesis tor DNA-Binding Polyamide Ligands", Organic Letters, 2010, vol. 12, No. 15, pp. 3488-3490.
Written Opinion of the International Searching Authority, issued in PCT/JP2020/010792, dated Jun. 9, 2020.

METHOD FOR PRODUCING PYRROLE-IMIDAZOLE (POLY)AMIDE

TECHNICAL FIELD

The present invention relates to a method for producing a pyrrole-imidazole (poly)amide by forming an amide bond between a carboxy group binding to pyrrole and an amino group binding to imidazole.

BACKGROUND ART

As an N-methylpyrrole-N-methylimidazole (Py-Im)polyamide, for example, the compounds represented by the following formulas (101), (102), and (103) are known (Non-Patent Document 1, or the like). The Py-Im polyamides are low molecular weight organic compounds that can cause various sequence-specifically bind to a DNA duplex depending on the combination of pyrrole and imidazole. In addition, since the Py-Im polyamides are resistant to a nuclease and has nuclear envelope permeability, the Py-Im polyamides are expected to be used in a diagnostic application for identifying DNA sequences and as a molecular probe. The Py-Im polyamides are also expected to be used as a transcriptional regulator that inhibits interaction between a transcription factor and double-stranded DNA.

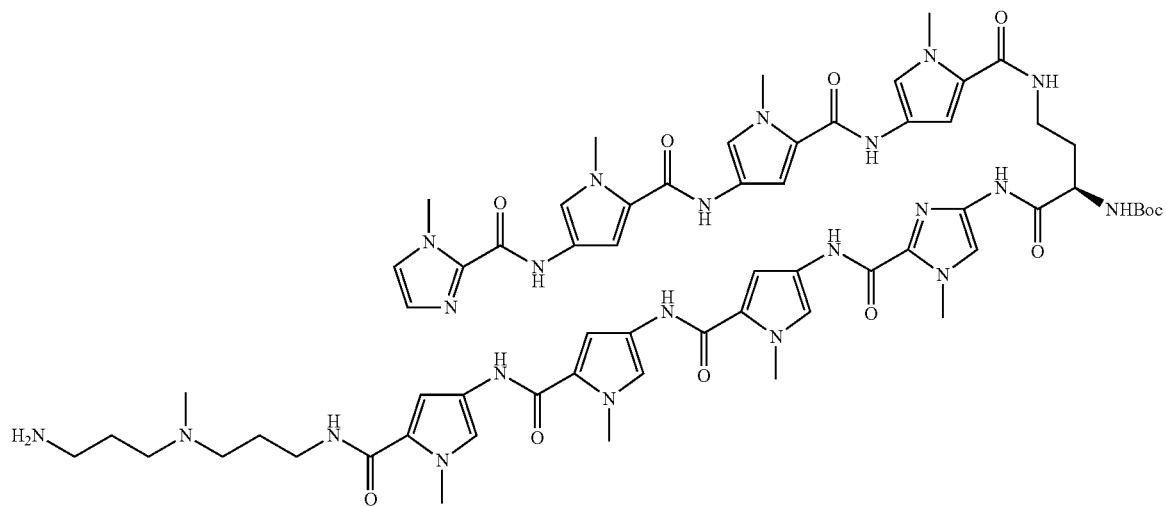

(101)

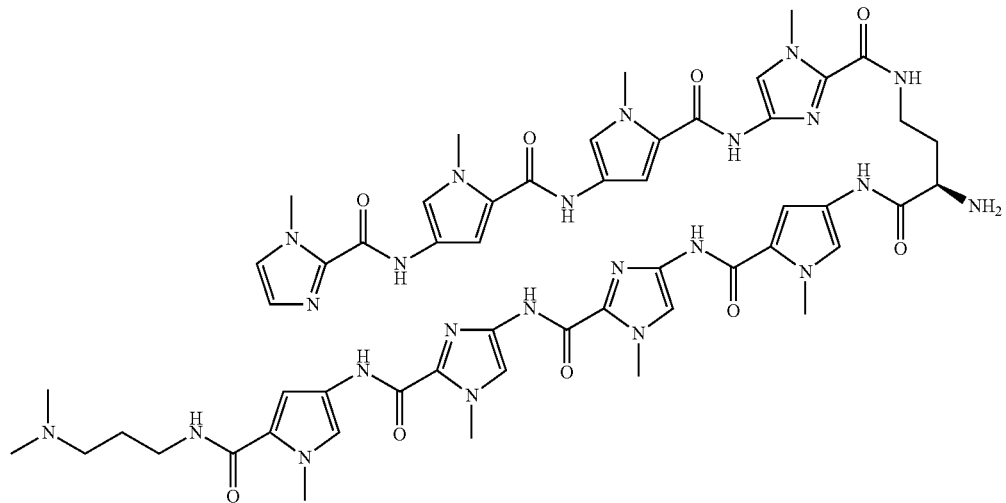

(102)

(103)
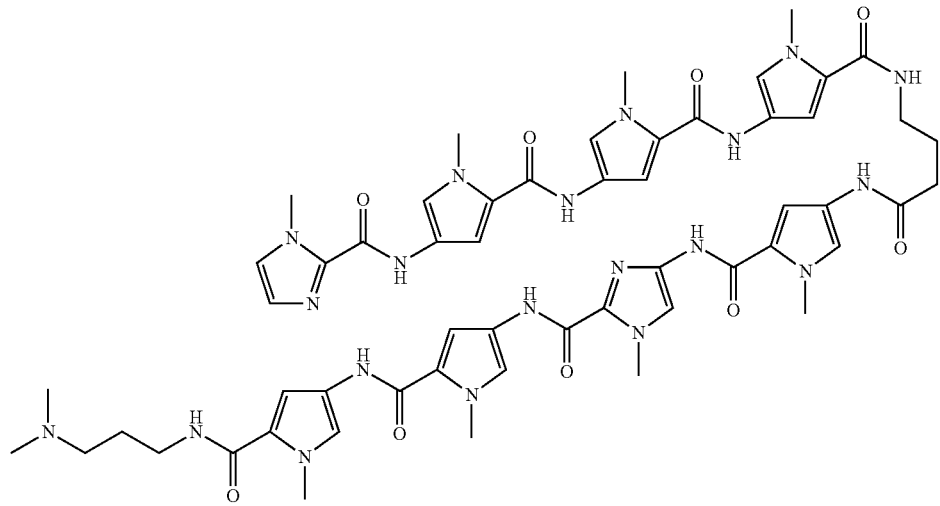
In order to produce Py-Im polyamide, it has been proposed to carry out a condensation reaction, specifically amidization reaction, between an aminopyrrolecarboxylic acid and an aminoimidazole carboxylic acid. Specifically, the following four types of reactions can be mentioned.
Type 1:
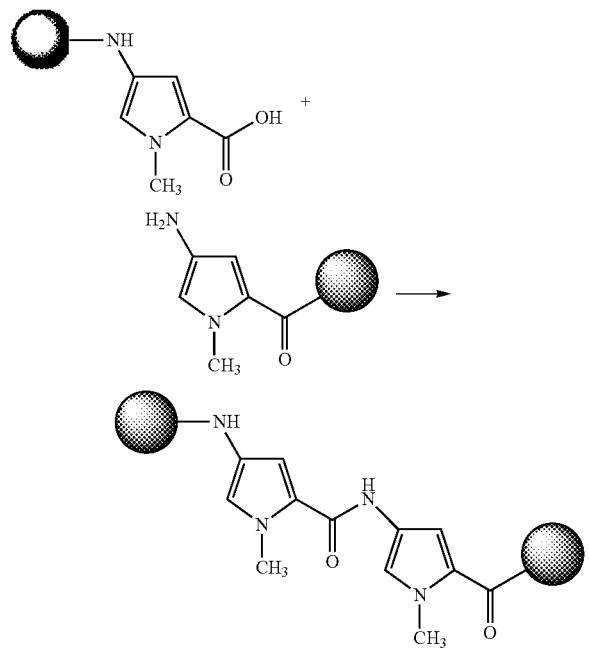
Type 2:
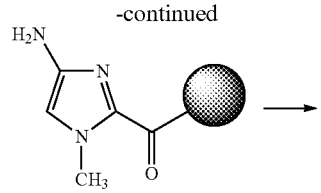
Type 3:

Type 4:

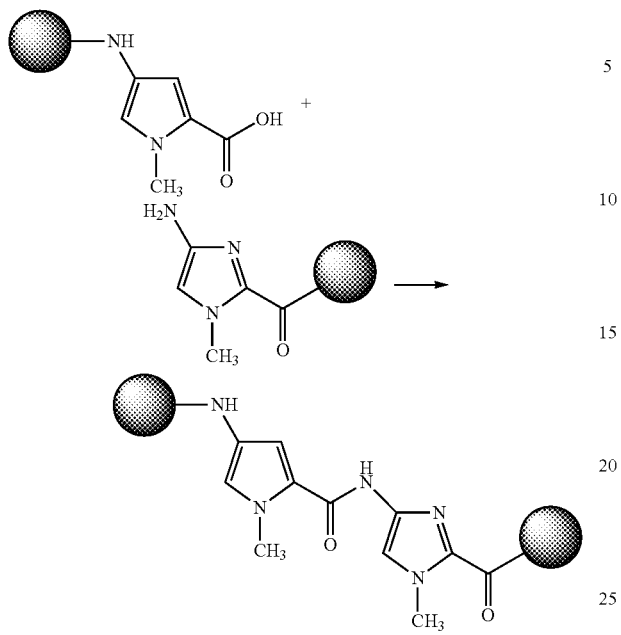

Type 1 is a reaction that forms an amide bond between a carboxy group binding to pyrrole and an amino group binding to another pyrrole, and type 2 is a reaction that forms an amide bond between a carboxy group binding to imidazole and an amino group binding to another imidazole. Type 3 is a reaction that forms an amide bond between a carboxy group binding to imidazole and an amino group binding to pyrrole, and type 4 is a reaction that forms an amide bond between a carboxy group binding to pyrrole and an amino group binding to imidazole. Among the four types of reactions, type 4 reaction is extremely difficult to proceed. For example, in the reactions corresponding to types 1 and 2 disclosed in Non-Patent Document 2, an amino bond is formed in high yield by any of the methods: a method in which a carboxylic acid is treated with triphosgen and then reacted with an amino group, and a method in which a carboxylic acid is transformed into an active ester and then reacting with an amino group. On the other hand, in the reaction corresponding to type 4, it is shown that an amide bond is obtained in high yield only when a carboxylic acid is treated with triphosgen and then reacted with an amino group, and an amide bond is obtained in significantly reduced yield in the way that a carboxylic acid is transformed into an active ester and then reacted with an amino group.

Regarding the type 4 reaction, Non-Patent Document 3 discloses that the pyrrolecarboxylic acid having an amino group protected by a 9-fluorenylmethyloxycarbonyl(Fmoc) group is activated with 1-[bis(dimethylamino)methylene]-1H-benzotriazolium 3-oxide hexafluorophosphate (HBTU) and reacted with aminoimidazole carboxylic acid tert-butyl ester in dimethylformamide (DMF) in the presence of diisopropylethylamine (DIEA). According to the supplementary material, the yield of the amide compound is 79%. It is also shown that the yield is 84% when the amide compound is obtained by subjecting a pyrrolecarboxylic acid having a nitro group at the 4-position to the same condensation reaction condition. Also, in Patent Document 1, it is shown that the pyrrolecarboxylic acid having an amino group protected by a tert-butoxycarbonyl(Boc) group is activated with 1-hydroxybenzotriazole (HOBt) and reacted with an aminoimidazole carboxylic acid ethyl ester in DMF in the presence of diisopropylethylamine (DIEA) at 37° C. for 48 hours and the yield is 94%.

PRIOR ART DOCUMENT

Patent Document

Patent Document 1: JP 2000-503324 A

Non-Patent Document

Non-Patent Document 1: Organic Letters, 2015, vol. 17, No. 1, pp 158-161
Non-Patent Document 2: Organic Letters, 2009, vol. 11, No. 17, pp 3910-3913
Non-Patent Document 3: Organic Letters, 2010, vol. 12, No. 15, pp 3488-3490

DISCLOSURE OF THE INVENTION

Problems to be Solved by the Invention

However, in the reaction disclosed in Non-Patent Document 3, the amide compound is obtained in a good yield, but it is required to improve the conversion rate more rapidly. It is also disclosed that it takes more than 18 hours to complete the reaction to form an amino bond between the carboxy group bonding to a pyrrole having an amino bond protected by Fmoc group not by Boc group and an amino group bonding to imidazole, in spite of the fact that Fmoc group is better than Boc group in terms of the reaction rate. Though the reaction to form an amide bond between a carboxy group binding to pyrrole having a nitro group at the 4-position and an amino group binding to imidazole is completed quickly, the nitro group at the 4-position of the pyrrole requires to be transformed into an amino group by a hydrogenation reaction under high pressure condition in order to produce a pyrrole-imidazole (poly)amide from the obtained amide compound. The method cannot be said to be an efficient method for producing a pyrrole-imidazole (poly)amide, since the step to protect the obtained amide compound having an amino group with Fmoc is further needed in some cases. Further, in the reaction disclosed in Patent Document 1, there is a problem that the compound obtained by activating a pyrrolecarboxylic acid having an amino group protected by Boc with HOBt and an aminoimidazole carboxylic acid derivative are inferior in the thermal stability and easily decomposed. The inventors of the present inventions replicated the reaction disclosed in Patent Document 1, but the reaction was irreproducible in a high yield.

The objective of the present invention is to provide a method to produce a pyrrole-imidazole (poly)amide compound in a high yield and with good reproducibility by rapidly improving the conversion rate even in the case where a nitro group is not introduced at the 4-position of the pyrrole group in the reaction for forming a amide bond between a carboxy group bonding to pyrrole and an amino group bonding to imidazole.

Means for Solving the Problems

The present invention that has solved the above problems is as follows.

[1] A method for producing a pyrrole-imidazole (poly) amide,
comprising the steps of reacting an aminoimidazole carboxylic acid derivative represented by the following formula (1):

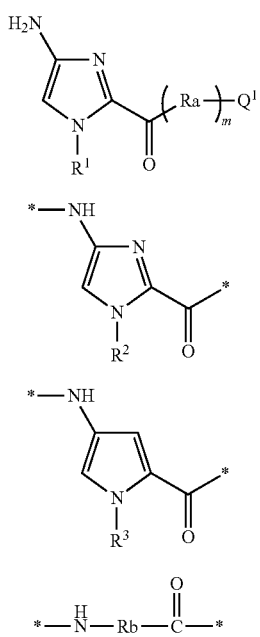

(1)

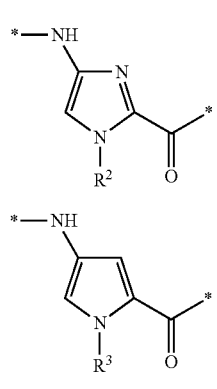

(2a)

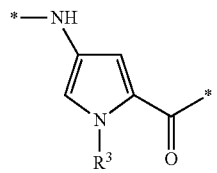

(2b)

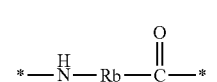

(2c)

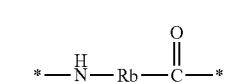

in the formula (1),
Ra is a (poly)amide-type organic group having 1 or more kinds of a unit selected from the units represented by the formulas (2a), (2b), and (2c) as a constituent unit, wherein a total number of the constituent unit is 1 or more,
$Q^1$ is a carrier, or an amino group optionally having a hydroxy group, an organic group, or a substituent,
m is 0 or 1,
$R^1$ to $R^3$ independently represent a $C_{1-12}$ alkyl group,
when the compound represented by the formula (1) has a plurality of units represented by the formula (2a), a plurality of $R^2$ may be the same as or different from each other,
when the compound represented by the formula (1) has a plurality of units represented by the formula (2b), a plurality of $R^3$ may be the same as or different from each other,
Rb represents a $C_{1-10}$ alkylene group wherein the alkylene group may be bonded with one or more groups selected from an amino group having a substituent, a $C_1$-12 alkoxy group optionally having a substituent, a $C_{2-12}$ alkenyloxy group optionally having a substituent, a $C_{6-12}$ aryloxy group optionally having a substituent, and a $C_{7-12}$ aralkyloxy group optionally having a substituent,
when the compound represented by the formula (1) has a plurality of units represented by the formula (2c),
plurality of Rb may be the same as or different from each other,
* represents a bond,
with a pyrrolecarboxylic acid derivative represented by the following formula (3):

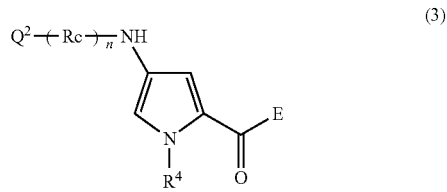

(3)

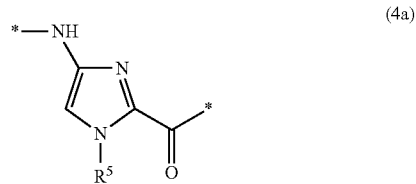

(4a)

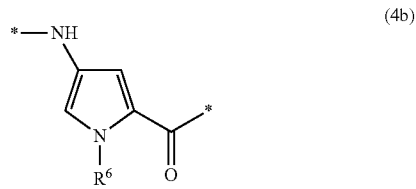

(4b)

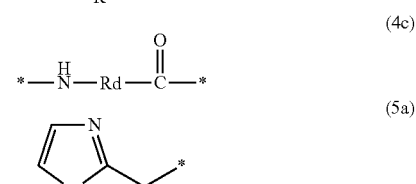

(4c)

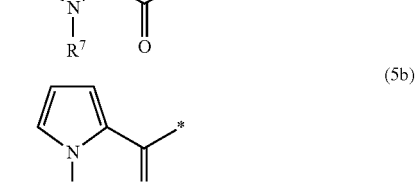

(5a)

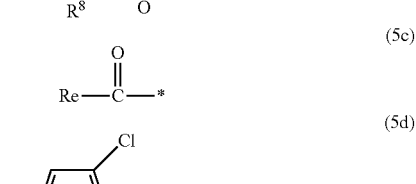

(5b)

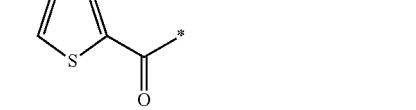

(5c)

(5d)

In the formula (3),
Rc is a (poly)amide-type organic group having 1 or more kinds of the unit selected from the units represented by the formulas (4a), (4b), and (4c) as a constituent unit and the total number of the constituent unit is 1 or more,
$Q^2$ is a protective group of an amino group, or a group represented by the formulas (5a), (5b), (5c) or (5d),
E is a leaving group,
n is 0 or 1,
$R^4$ to $R^8$ each independently represents a $C_{1-12}$ alkyl group,
when the compound represented by the formula (3) has a plurality of units represented by the formula (4a), a plurality of $R^5$ may be the same as or different from each other, when a compound represented by the formula (3) has a plurality of units represented by the formula (4b), a plurality of $R^6$ may be the same as or different from each other, Rd represents a $C_{1-10}$ alkylene group wherein the alkylene group may be bonded with one or more groups selected from an amino group having a substituent, a $C_{1-12}$ alkoxy group optionally having a substituent, a $C_{2-12}$ alkenyloxy group optionally having a substituent, and a $C_{6-12}$ aryloxy group optionally having a substituent, and a $C_{7-12}$ aralkyloxy group optionally having a substituent, when a compound represented by the formula (3) has a plurality of units represented by the formula (4c), a plurality of Rd may be the same as or different from each other, Re represents a $C_{1-10}$ alkyl group wherein the alkyl group may be bonded with one or more groups selected from an amino group having a substituent, a $C_{1-12}$ alkoxy group optionally having a substituent, a $C_{2-12}$ alkenyloxy group optionally having a substituent, a $C_{6-12}$ aryloxy group optionally having a substituent, and a $C_{7-12}$ aralkyloxy group optionally having a substituent,

* represents a bond, in the presence of a heterocyclic aromatic compound as a solvent to produce the pyrrole-imidazole (poly)amide represented by the following formula (6):

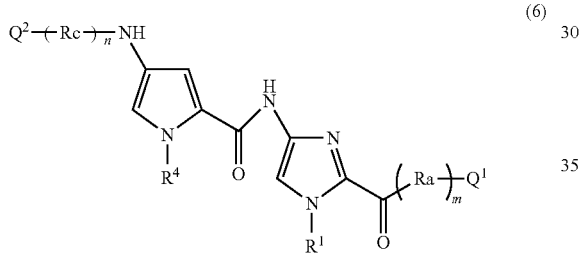
(6)

in the formula (6), Ra, Rc, $Q^1$, $Q^2$, $R^1$, $R^4$, m and n are the same as described above.

[2] The production method according to the above [1], comprising the steps of reacting a pyrrolecarboxylic acid represented by the following formula (3)':

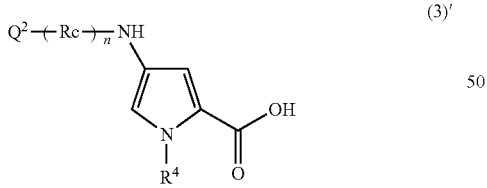
(3)' in the formula (3)', Rc, $Q^2$, n, and $R^4$ are the same as described above, to obtain the pyrrolecarboxylic acid derivative represented by the formula (3), and isolating the obtained pyrrolecarboxylic acid derivative represented by the formula (3), wherein the isolated pyrrolecarboxylic acid derivative represented by the formula (3) is reacted with the aminoimidazole carboxylic acid derivative represented by the formula (1).

[3] The production method according to the above [1] and [2], wherein the E is any one of the following formulas (31) to (36):

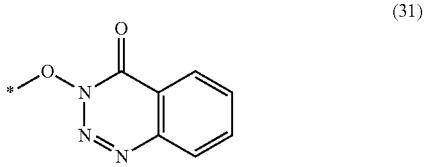
(31)

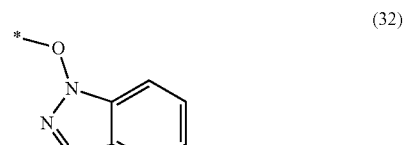
(32)

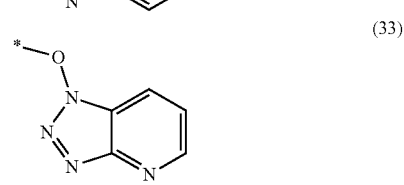
(33)

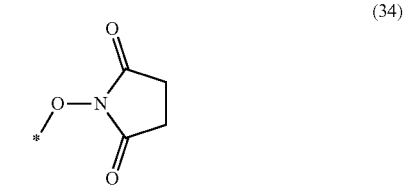
(34)

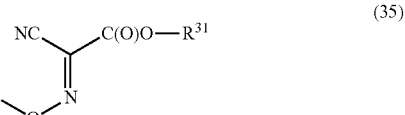
(35)

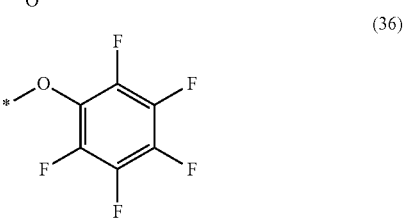
(36)

in the formulas, $R^{31}$ represents a $C_{1-8}$ alkyl group, and * represents a bond.

[4] The production method according to any one of the above [1] to [3], wherein the aminoimidazole carboxylic acid derivative represented by the formula (1) is a derivative represented by the following formula (1-1):

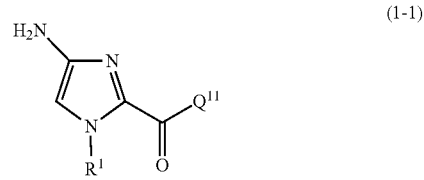
(1-1)

in the formula (1-1), $R^1$ is the same as described above, and $Q^{11}$ represents a soluble carrier, a hydroxy group, a $C_{1-12}$ alkoxy group optionally having a substituent, a $C_{2-12}$ alkenyloxy group optionally having a substituent, a $C_{6}$-12 aryloxy group optionally having a substituent, a $C_{7-12}$ aralkyloxy group optionally having a substituent, or an amino group optionally having a substituent.

[5] The production method according to any of the above [1] to [4], wherein the reaction between the aminoimidazole carboxylic acid derivative represented by the formula (1) and the pyrrolecarboxylic acid derivative represented by the formula (3) is carried out in the presence of a tertiary amine.

[6] The production method according to any one of the above [1] to [5], wherein the tertiary amine is an amine represented by the following formula (a):

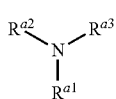
(a)

in the formula (a), $R^{a1}$ represents a $C_{1-8}$ linear alkyl group, $R^{a2}$ to $R^{a3}$ independently represents a $C_{3-10}$ branched alkyl group, a $C_{4-8}$ linear alkyl group, or $R^{a2}$ and $R^{a3}$ are connected together to form a $C_{3-10}$ saturated ring with the nitrogen atom bound to $R^{a2}$ and $R^{a3}$, wherein the methylene group in the $C_{3-10}$ saturated ring may be replaced with an oxygen atom or —CO—.

[7] The production method according to any one of the above [1] to [6], wherein the tertiary amine is diisopropylethylamine, tributylamine, or N-methylmorpholine.

[8] A pyrrolecarboxylic acid derivative compound represented by the following formula (3-1-1) or (3-1-2):

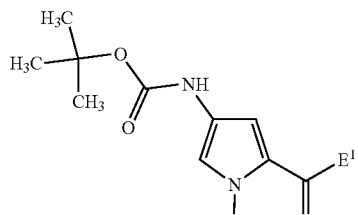
(3-1-1)

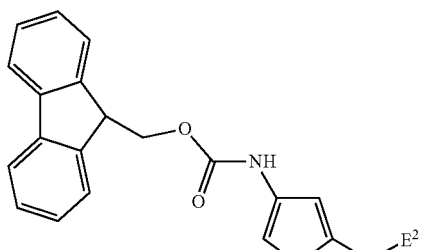
(3-1-2)

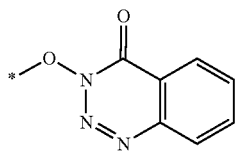
(31)

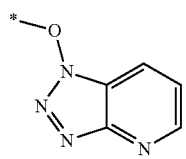
(33)

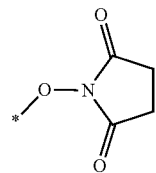
(34)

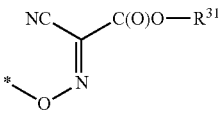
(35)

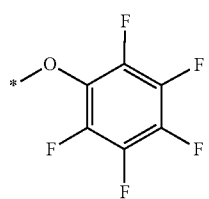
(36)

in the formulas (3-1-1) and (3-1-2), $E^1$ is any one selected from the formulas (31), (34), (35), and (36), $E^2$ is any one selected from the formula (31), (33), (34), and (35), $R^4$ represents a $C_{1-12}$ alkyl group, and $R^{31}$ represents a $C_{1-5}$ alkyl group, * represents a bond.

[9] A solid of a pyrrolecarboxylic acid derivative compound represented by the following formula (3-2-1) or (3-2-2):

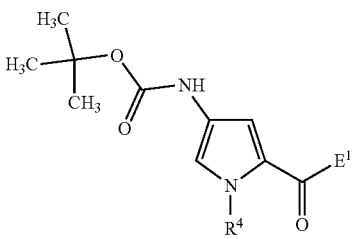
(3-2-1)

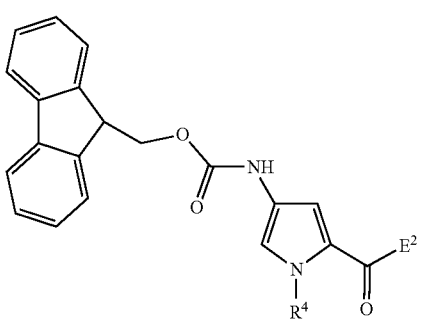
(3-2-2)

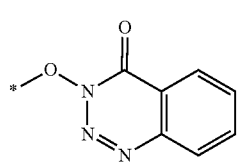
(31)

(33)

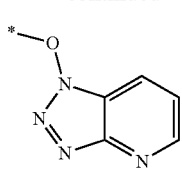

(34)

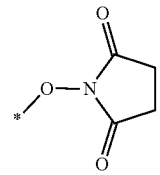

(35)

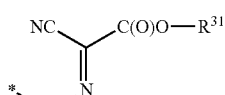

(36)

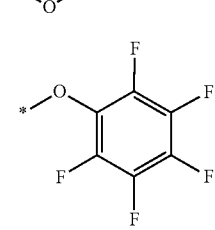

in the formulas (3-2-1) and (3-2-2), $E^1$ is any one selected from the formulas (31), (34), (35), or (36). $E^2$ is any one selected from the formula (31), (33), (34), and (35), $R^4$ represents a $C_{1-12}$ alkyl group, $R^{31}$ represents a $C_{1-5}$ alkyl group, * represents a bond.

[10] A method for forming an amide bond between a carboxy group bound to pyrrole and an amino group bound to imidazole, the method comprising the steps of substituting the OH of the carboxy group bound to pyrrole with a leaving group, and then allowing imidazole having the amino group is to be reacted in the presence of a heterocyclic aromatic compound as a solvent.

Effects of the Invention

According to the present invention, the amide bond between the carboxy group bound to pyrrole and the amino group bound to imidazole is formed in the presence of a heterocyclic aromatic compound as a solvent, the thermal stability of the pyrrolecarboxylic acid derivative is improved and the conversion rate is rapidly improved; as a result, the production of pyrrole-imidazole (poly)amide can be achieved in high yield and with good reproducibility.

MODE FOR CARRYING OUT THE INVENTION

Figure 1:
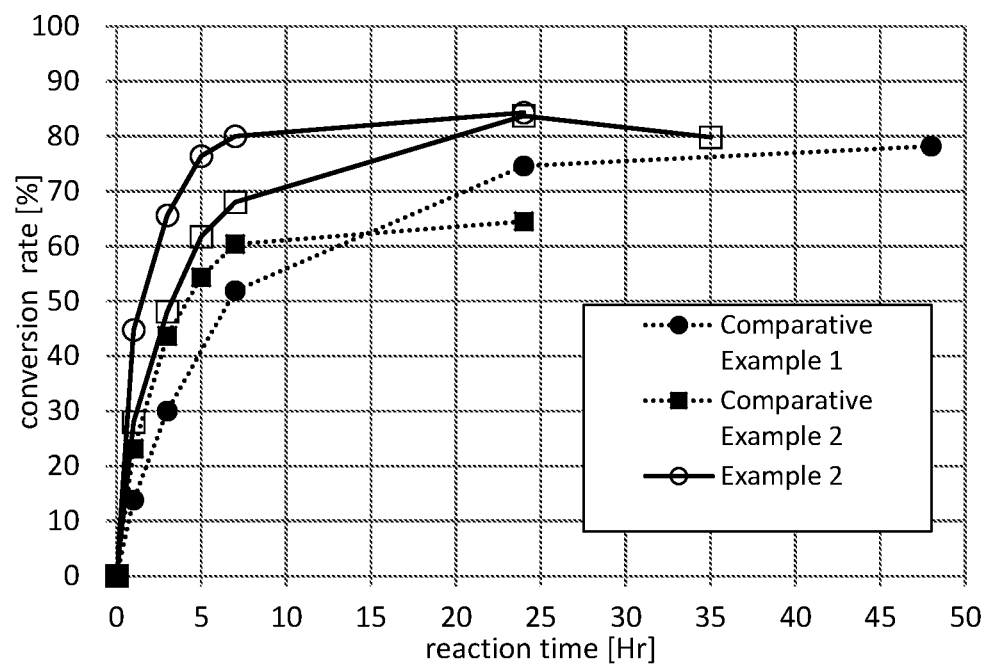
FIG. 1 is a graph showing the conversion rates in the reactions of Examples 2 and 3, and Comparative Examples 1 and 2.

The method for producing a pyrrole-imidazole (poly) amide of the present invention is characterized in that the aminoimidazole carboxylic acid derivative represented by the formula (1) and the pyrrolecarboxylic acid derivative represented by the formula (3) are reacted to form an amide bond in the presence of a heterocyclic aromatic compound as a solvent. By the method having the characteristics, a pyrrole-imidazole (poly)amide is produced with a high reproducibility and in a high yield, since the conversion rate is rapidly improved with the improved thermal stability of the raw material.

Aminoimidazole Carboxylic Acid Derivative

The aminoimidazole carboxylic acid derivative used in the production of the pyrrole-imidazole (poly)amide of the present invention is the derivative represented by the following formula (1).

(1)

[Formula (1) structure]

(2a)

[Formula (2a) structure]

(2b)

[Formula (2b) structure]

(2c)

*—N(H)—Rb—C(=O)—*

In the formula (1),

Ra is a (poly)-amide-type organic group having 1 or more kinds of a unit selected from the units represented by the formulas (2a), (2b), and (2c) as a constituent unit, wherein a total number of the constituent unit is 1 or more, $Q^1$ is a carrier, or an amino group optionally having a hydroxy group, an organic group, or a substituent, m is 0 or 1, $R^1$ to $R^3$ independently represent a $C_{1-12}$ alkyl group, when the compound represented by the formula (1) has a plurality of units represented by the formula (2a), a plurality of $R^2$ may be the same as or different from each other, when the compound represented by the formula (1) has a plurality of units represented by the formula (2b), a plurality of $R^3$ may be the same as or different from each other, Rb represents a $C_{1-10}$ alkylene group wherein the alkylene group may be bonded with one or more groups selected from an amino group having a substituent, a $C_{1-12}$ alkoxy group optionally having a substituent, a $C_{2-12}$ alkenyloxy group optionally having a substituent, a $C_{6-12}$ aryloxy group optionally having a substituent, and a $C_{7-12}$ aralkyloxy group option ally having a substituent, when the compound represented by the formula (1) has a plurality of units represented by the formula (2c), a plurality of Rb may be the same as or different from each other,

* represents a bond.

The constituent unit of the (poly)amide-type organic group represented by Ra is not particularly restricted as long as the unit is the unit represented by the formula (2a), the formula (2b), and the formula (2c). There are no particular restrictions on the order to bond of the units.

Further, the content ratio of each unit represented by the formula (2a), the formula (2b), and the formula (2c) constituting the (poly)amide type organic group represented by Ra is not particularly restricted, Ra can be composed of only one of the unit represented by the formula (2a), the formula (2b), or the formula (2c). For example, the ratio of the number of units represented by the formula (2a) in the total constituent units number of the (poly)amide-type organic group represented by Ra is preferably 50% or more, and more preferably 60% or more.

The number of constituent units of the (poly)amide-type organic group represented by Ra is preferably 1 or more and 30 or less, more preferably 1 or more and 16 or less.

Examples of the $C_{1-12}$ alkyl group represented by $R^1$ to $R^3$ include a methyl group, an ethyl group, an n-propyl group, an isopropyl group, an n-butyl group, and tert-butyl group.

As $R^1$ to $R^3$, a $C_{1-6}$ alkyl group is preferable, a $C_{1-3}$ alkyl group is more preferable, and a methyl group is further preferable.

Examples of the $C_{1-10}$ alkylene group represented by Rb include a methylene group, an ethylene group, a propylene group, and a butylene group. The alkylene groups may be linear or branched, and preferably linear.

As Rb, a $C_{1-8}$ alkylene group is preferable, and a $C_{1-5}$ alkylene group is more preferable.

Examples of the amino group that has a substituent and that may be bonded to the $C_{1-10}$ alkylene group represented by Rb include the amino groups substituted with one or more selected from $C_{1-10}$ alkyl group and a $C_{6-10}$ allyl group, such as a methylamino group, an ethylamino group, a dimethylamino group, an ethylmethylamino group, a phenylamino group, a methylphenylamino group, and a diphenylamino group; the amino groups bonded by a protective group, such as an acetylamino group, a tert-butoxycarbonylamino group, a benzyloxycarbonylamino group, a 9-fluorenylmethyloxycarbonylamino group, a 2,2,2-trichloroethoxycarbonylamino group, an aryloxycarbonylamino group, and a trifluoroacetylamino group; an amino group bonded by a linker such as *—$R^Z$—COOH wherein $R^Z$ represents a $C_{1-20}$ alkanediyl group, and —$CH_2$— contained in the alkanediyl group may be replaced with —O—, and * represents a bond; an amino group to which a fluorescent dye such as 5-carboxytetramethyllodamine (TAMRA), a drug such as an alkylating agent, and as pyrrole-imidazole (poly)amide bond via a linker.

Examples of the amino group having a substituent that may be bonded to a $C_{1-10}$ alkylene group represented by Rb preferably include an amino group having a carbamate type protective group, such as a tert-butoxycarbonylamino group and 9-fluorenylmethyloxycarbonylamino group.

Examples of the $C_{1-12}$ alkoxy group that may be bonded to a $C_{1-10}$ alkylene group represented by Rb include a methoxy group, an ethoxy group, a butoxy group, a 2-methoxyethoxy group, and a $C_{1-6}$ alkoxy group is preferable.

Examples of the $C_{2-12}$ alkenyloxy group that may be bonded to a $C_{1-10}$ alkylene group represented by Rb include a vinyloxy group, an aryloxy group, and a methallyloxy group, and a $C_{2-6}$ alkenyloxy group is preferable.

Examples of the $C_{6-12}$ aryloxy group that may be bonded to a $C_{1-10}$ alkylene group represented by Rb include a phenoxy group, a naphthoxy group, and a biphenyloxy group, and a $C_{6-10}$ aryloxy group is preferable.

Examples of the $C_{7-12}$ aralkyloxy group that may be bonded to a $C_{1-10}$ alkylene group represented by Rb include a benzyloxy group and a 1-phenethyloxy group, and a $C_{7-10}$ aralkyloxy group is preferable.

Examples of the substituent that $C_{1-12}$ alkoxy group, $C_{2-12}$ alkenyloxy group, $C_{6-12}$ allyloxy group, and $C_{7-12}$ aralkyloxy group that may be bound to the $C_{1-10}$ alkylene group represented by Rb may have include a nitro group; a nitrile group; a halogen atom such as a fluorine atom, a chlorine atom and a bromine atom.

Examples of the carriers represented by $Q^1$ include a solid phase carrier and a soluble carrier.

The solid-phase carrier represented by $Q^1$ is not particularly restricted, and is exemplified by a solid-phase carrier composed of a paper such as a filter paper, a commercially available membrane filter, a glass solid-phase carrier, a silicon solid-phase carrier, a resin solid-phase carrier, a solid-phase carrier containing other polymer compound, a solid-phase carrier containing a metal such as gold, silver, platinum, and iron, and is preferably a resin solid-phase carrier, more preferably PAM Resin manufactured by Sigma-Aldrich Co. LLC, Wang Resin manufactured by Watanabe Chemical Industry Co., Ltd., 2-CTC Resin manufactured by Watanabe Chemical Industry Co., Ltd., Oxime Resin manufactured by Watanabe Chemical Industry Co., Ltd., and a polystyrene resin solid-phase carrier such as a carrier to which aminomethylated polystyrene and a monomer are bonded. The size and form of the solid-phase carrier can be appropriately selected those suitable for various operations and detections.

Examples of the soluble carriers represented by $Q^1$ include 3,4,5-tri(n-octadecyloxy)benzyl alcohol, 3,5-di(docosyloxy)benzyl alcohol, 2,4-di(docosyloxy)benzyl alcohol, trityl type compound, 2-[12-(docosyloxy)dodecyloxy]-9-(3-fluorophenyl)-9-bromofluorene.

The organic group represented by $Q^1$ is preferably a $C_{1-12}$ organic group and is exemplified by a $C_{1-12}$ alkoxy group optionally having a substituent, a $C_{2-12}$ alkenyloxy group optionally having a substituent, a $C_{6-12}$ aryloxy group optionally having a substituent, and a $C_{7-12}$ aralkyloxy group optionally having a substituent.

The $C_{1-12}$ alkoxy group, $C_{2-12}$ alkenyloxy group, $C_{6-12}$ aryloxy group, and $C_{7-12}$ aralkyloxy group represented by $Q^1$ may the same as the $C_{1-12}$ alkoxy group, a $C_{2-12}$ alkenyloxy group, a $C_{6-12}$ aryloxy group, and a $C_{7-12}$ aralkyloxy groups that may be bonded to the $C_{1-10}$ alkylene group represented by Rb, and the preferable range of carbon number is also the same as that of the groups.

The substituent that the $C_{1-12}$ alkoxy group, $C_{2-12}$ alkenyloxy group, $C_{6-12}$ aryloxy group, and $C_{7-12}$ aralkyloxy group may have is the same as the substituent that the $C_{1-12}$ alkoxy group, $C_{2-12}$ alkenyloxy group, and $C_{6-12}$ aryloxy group that may be bonded to the $C_{1-10}$ alkylene group represented by Rb may have, and the substituent that $C_{7-12}$ aralkyloxy group may optionally have.

The organic group represented by $Q^1$ are preferably a $C_{1-12}$ alkoxy group optionally having a substituent or a $C_{7-12}$ aralkyloxy group optionally having a substituent, more preferably a $C_{1-6}$ alkoxy group optionally having a substituent or a $C_{7-10}$ aralkyloxy group optionally having a substituent, even more preferably a $C_{1-6}$ alkoxy group or a $C_{7-10}$ aralkyloxy group having a substituent, even more preferably a $C_{1-6}$ alkoxy group or a $C_{7-10}$ aralkyloxy group having a nitro group as a substituent, and particularly preferably an ethoxy group or a nitrobenzyloxy group. When the organic group represented by $Q^1$ is an ethoxy group or a nitrobenzyloxy group, the thermal stability of the aminoimidazole carboxylic acid derivative represented by the formula (1) becomes higher, so that the amide bond can be obtained in a higher yield.

The substituent that the amino group represented by $Q^1$ may have includes a $C_{1-12}$ alkyl group, a $C_{2-12}$ alkenyl group, a $C_{7-12}$ aralkyl group, and a $C_{6-12}$ allyl group. A $C_{1-12}$ alkylamino group may be bonded to the alkyl group, alkenyl group, aralkyl group, and allyl group.

The substituent that the amino group represented by $Q^1$ may have is preferably a $C_{1-12}$ alkyl group bonded by a $C_{1-12}$ mono- or dialkylamino group, and the alkyl group is hereinafter referred to as an alkylaminoalkyl group.

Examples of the amino group that is represented by $Q^1$ and that has an alkylaminoalkyl group as a substituent include a (methylaminomethyl)amino group, a (dimethylaminomethyl)amino group, a (2-methylaminoethyl)amino group, a (2-dimethylaminoethyl)amino group, a (3-methylaminopropyl)amino group, and a (3-dimethylaminopropyl)amino group, and the alkyl group to which a dialkylamino group such as a (dimethylaminomethyl)amino group, a (2-dimethylaminoethyl)amino group, and a (3-dimethylaminopropyl)amino group is bonded is preferable, and a (3-dimethylaminopropyl)amino group is more preferable.

The amino group that optionally has a substituent and that is represented by $Q^1$ preferably has one or two substituents, and more preferably has one substituent.

The aminoimidazole carboxylic acid derivative in the case where m in the formula (1) is 0 is preferably the derivative represented by the following formula (1-1).

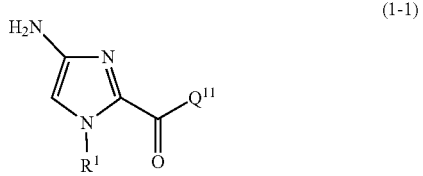

(1-1)

In the formula (1-1), $R^1$ is the same as described above, and $Q^{11}$ represents a soluble carrier, a hydroxy group, a $C_{1-12}$ alkoxy group optionally having a substituent, a $C_{2-12}$ alkenyloxy group optionally having a substituent, a $C_{6-12}$ aryloxy group optionally having a substituent, a $C_{7-12}$ aralkyloxy group optionally having a substituent, or an amino group optionally having a substituent.

Examples of the soluble carrier represented by $Q^{11}$ include the same soluble carriers represented by $Q^1$.

The $C_{1-12}$ alkoxy group, $C_{2-12}$ alkenyloxy group, $C_{6-12}$ aryloxy group, and $C_{7-12}$ aralkyloxy group represented by $Q^{11}$ are the same as the $C_{1-12}$ alkoxy group, $C_{2-12}$ alkenyloxy group, $C_{6-12}$ aryloxy group, and $C_{7-12}$ aralkyloxy group that may be bonded to the $C_{1-10}$ alkylene group represented by Rb, and the range of the preferable carbon numbers is also the same.

The substituent that the $C_{1-12}$ alkoxy group, $C_{2-12}$ alkenyloxy group, $C_{6-12}$ aryloxy group, and $C_{7-12}$ aralkyloxy group represented by $Q^{11}$ may have is exemplified by the same substituent that the $C_{1-12}$ alkoxy group, $C_{2-12}$ alkenyloxy group, $C_{6-12}$ aryloxy group, and $C_{7-12}$ aralkyloxy group that may be bonded to the $C_{1-10}$ alkylene group represented by Rb may have.

The substituent that the amino group represented by $Q^{11}$ may have is exemplified by the same substituents as that the amino group represented by $Q^1$ may have, and preferable substituent and preferable number of the substituent are also the same.

$Q^{11}$ is preferably a soluble carrier, a $C_{7-12}$ aralkyloxy group optionally having a substituent, and an amino group optionally having a substituent. The $C_{7-12}$ aralkyloxy group is more preferably a $C_{7-10}$ aralkyloxy group optionally having a substituent, even more preferably a $C_{7-10}$ aralkyloxy group having a substituent, even more preferably a $C_{7-10}$ aralkyloxy group having a nitro group as a substituent, and particularly preferably a nitrobenzyloxy group.

The aminoimidazole carboxylic acid derivative represented by the formula (1) in the production of the pyrrole-imidazole (poly)amide of the present invention may be a free form, a salt with an acid such as hydrochloride, hydrobromide, sulfate, or methanesulfonate, or an alkali metal salt such as lithium salt, sodium salt or potassium salt. The aminoimidazole carboxylic acid derivative represented by the formula (1) may be used in any form of dry crystal, wet crystal, or an extraction solution.

The amount of use of the aminoimidazole carboxylic acid derivative represented by the formula (1) in the production of the pyrrole-imidazole (poly)amide of the present invention per 1 mol of the pyrrolecarboxylic acid derivative represented by the formula (3) is, for example, preferably 0.1 mol or more, more preferably 0.5 mol or more, and even more preferably 0.8 mol or more, and for example, preferably 5.0 mol or less, more preferably 2.0 mol or less, and even more preferably 1.5 mol or less.

The amount of substance of an aminoimidazole carboxylic acid derivative to 1 mol of a pyrrolecarboxylic acid derivative may be hereinafter referred to as "equivalent (eq)" in some cased.

Pyrrolecarboxylic Acid Derivative

The pyrrolecarboxylic acid derivative used in the production of the pyrrole-imidazole (poly)amide of the present invention is the derivative represented by the following formula (3).

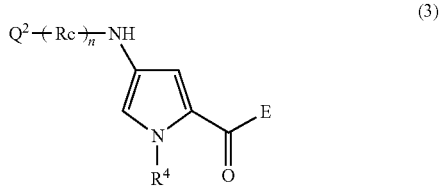

(3)

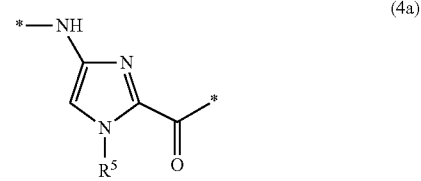

(4a)

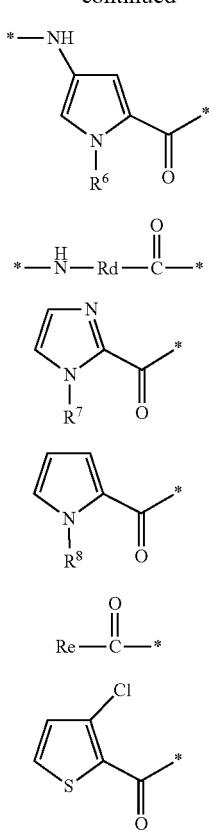

(4b)

(4c)

(5a)

(5b)

(5c)

(5d)

In the formula (3),

Rc is a (poly)amide-type organic group having 1 or more kinds of the unit selected from the units represented by the formulas (4a), (4b), and (4c) as a constituent unit and the total number of the constituent unit is 1 or more, $Q^2$ is a protective group of an amino group, or a group represented by the formulas (5a), (5b), (5c) or (5d), E is a leaving group, n is 0 or 1, $R^4$ to $R^8$ each independently represents a $C_{1-12}$ alkyl group, when the compound represented by (3) has a plurality of units represented by the formula (4a), a plurality of $R^5$ may be the same as or different from each other, when a compound represented by the formula (3) has a plurality of units represented by the formula (4b), a plurality of $R^6$ may be the same as or different from each other, Rd represents a $C_{1-10}$ alkylene group wherein the alkylene group may be bonded with one or more groups selected from an amino group having a substituent, a $C_{1-12}$ alkoxy group optionally having a substituent, a $C_{2-12}$ alkenyloxy group optionally having a substituent, and a $C_{6-12}$ aryloxy group optionally having a substituent, and a $C_{7-12}$ aralkyloxy group optionally having a substituent, when a compound represented by the formula (3) has a plurality of units represented by the formula (4c), a plurality of Rd may be the same as or different from each other, Re represents a $C_{1-10}$ alkyl group wherein the alkyl group may be bonded with one or more groups selected from an amino group having a substituent, a $C_{1-12}$ alkoxy group optionally having a substituent, a $C_{2-12}$ alkenyloxy group optionally having a substituent, a $C_{6-12}$ aryloxy group optionally having a substituent, and a $C_{7-12}$ aralkyloxy group optionally having a substituent,

* represents a bond.

The constituent unit of the (poly)amide-type organic group represented by Rc is not particularly restricted as long as the constituent unit is the unit represented by the formula (4a), the formula (4b), and the formula (4c), and the bonding order of each unit is not particularly restricted.

Further, the content ratio of each unit represented by the formula (4a), the formula (4b), and the formula (4c) constituting the (poly)amide type organic group represented by Rc is not particularly limited. Rc may be constituted only of any one of the units represented by the formula (4a), the formula (4b), or the formula (4c). For example, the ratio of the number of the units represented by the formula (4a) is preferably 50% or more, and more preferably 60% or more, in the total number of the constituent units of (poly)amide-type organic group represented by Ra.

The number of constituent units of the (poly)amide-type organic group represented by Rc is preferably 1 or more and 30 or less, and more preferably 1 or more and 16 or less.

Examples of the protective group of the amino group represented by $Q^2$ include a $C_{1-15}$ substituted or unsubstituted alkyloxycarbonyl group such as a tert-butyloxycarbonyl group, a methoxycarbonyl group, or a 9-fluorenylmethoxycarbonyl group; a $C_{7-12}$ substituted or unsubstituted aralkyloxycarbonyl group such as a benzyloxycarbonyl group and a p-methoxybenzyloxycarbonyl group; a $C_{2-12}$ substituted or unsubstituted acyl group such as an acetyl group and a benzoyl group.

The protective group of the amino group represented by $Q^2$ is preferably a $C_{1-15}$ substituted or unsubstituted alkyloxycarbonyl group, more preferably a tert-butyloxycarbonyl group and a 9-fluorenylmethoxycarbonyl group.

$Q^2$ is preferably the protective group of amino group or the groups represented by the formula (5a), the formula (5b), the formula (5c) or the formula (5d), and is more preferably the protective group of the amino group.

Examples of the $C_{1-12}$ alkyl group represented by $R^4$ to $R^8$ include the same as the $C_{1-12}$ alkyl group represented by $R^1$ to $R^3$, and the preferred group is also the same.

Examples of the leaving group represented by E include a halogen atom, an oxime residue, and an —$OR^X$ group. $R^X$ represents a nitrogen atom-containing complex such as a triazolidinone ring group, a triazole ring group, a succinimide ring group, and a dimethoxytriazyl ring group; an aryl halide group; a carboxylic acid ester group; a sulfonic acid ester group; an acyl group; the groups may optionally have a substituent. The leaving group is preferably an oxime residue, or —$OR^X$ group, and more preferably the following formulas (31) to (36). When the leaving group represented by E is the formulas (31) to (36), the thermal stability of the pyrrolecarboxylic acid derivative is further improved, and then the conversion rate is rapidly improved, therefore, an amide bond can be formed in a high yield.

(31)

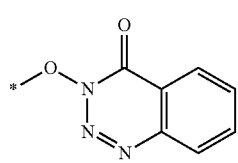

(32)

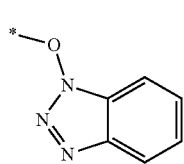

(33)

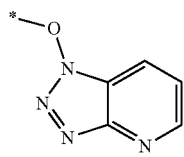

(34)

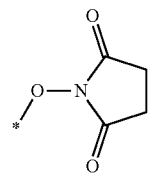

(35)

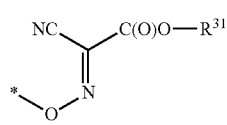

(36)

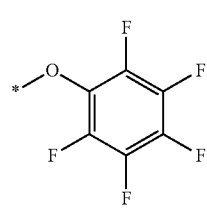

In the formula, $R^{31}$ represents a $C^{1-5}$ alkyl group, and * represents a bond.

Examples of the $C_{1-5}$ alkyl group represented by $R^{31}$ include the $C_{1-5}$ alkyl group among the $C_{1-12}$ alkyl group represented by $R^1$ to $R^3$.

$R^{31}$ is preferably a $C_{1-3}$ alkyl group, and more preferably an ethyl group.

The leaving group represented by E is more preferably the formula (31), the formula (32), the formula (33), the formula (35), or the formula (36), even more preferably the formula (32), the formula (33) or the formula (35), and particularly preferably the formula (35). When the leaving group represented by E is the formula (32), the formula (33), or the formula (35), an amide bond can be formed in a higher yield. Further, when the leaving group represented by E is the formula (33) or the formula (35), the reactivity is enhanced, and an amide bond can be formed in a high yield and in a short reaction time.

Examples of the $C_{1-10}$ alkylene represented by Rd include the same as the $C_{1-10}$ alkylene group represented by Rb, and the preferable range of carbon atoms is also the same.

Examples of the amino group having a substituent, $C_{1-12}$ alkoxy group optionally having a substituent, $C_{2-12}$ alkenyloxy group optionally having a substituent, $C_{6-12}$ aryloxy group optionally having a substituent, and $C_{7-12}$ aralkyloxy group optionally having a substituent that may be bonded to the $C_{1-10}$ alkylene group represented by Rd include the same as the amino group having a substituent, $C_{1-12}$ alkoxy group optionally having a substituent, $C_{2-12}$ alkenyloxy group optionally having a substituent, $C_{6-12}$ aryloxy group optionally having a substituent, and $C_{7-12}$ aralkyloxy group optionally having a substituent that may be bonded to the $C_{1-10}$ alkylene represented by Rb, and the range of the preferred groups is also the same.

Examples of the $C_{1-10}$ alkyl group represented by Re include the $C_{1-10}$ alkyl group among the $C_{1-12}$ alkyl groups represented by $R^1$ to $R^3$.

Re is preferably a $C_{1-8}$ alkyl group, and more preferably a $C_{1-5}$ alkyl group.

Examples of the amino group having a substituent, $C_{1-12}$ alkoxy group optionally having a substituent, $C_{2-12}$ alkenyloxy group optionally having a substituent, $C_{6-12}$ aryloxy group optionally having a substituent, and $C_{7-12}$ aralkyloxy group optionally having a substituent that may be bonded to the $C_{1-10}$ alkylene group represented by Re include the same as the amino group having a substituent, $C_{1-12}$ alkoxy group optionally having a substituent, $C_{2-12}$ alkenyloxy group optionally having a substituent, $C_{6-12}$ aryloxy group optionally having a substituent, and $C_{7-12}$ aralkyloxy group optionally having a substituent that may be bonded to the $C_{1-10}$ alkylene group represented by Rb, and the range of the preferred groups is also the same.

The pyrrolecarboxylic acid derivative represented by the formula (3) is produced by reacting a pyrrolecarboxylic acid represented by the following formula (3)' with the reagents such as 1-hydroxybenzotriazole (HOBt), 3,4-dihydro-3-hydroxy-4-oxo-1,2,3-benzotriazine (HOOBt), 1-hydroxy-7-azabenzotriazole (HOAt), N-hydroxysuccinimide (HOSu), cyano (hydroxyimino)ethyl acetate (Oxyma), and pentafluorophenol (HOPFP) and a condensing agent such as 1-ethyl-3-(3-dimethylaminopropyl)carbodiimide.

(3)'

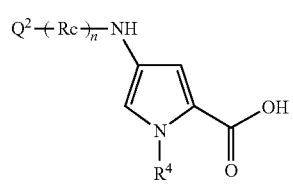

In the formula (3)', Rc, $Q^2$, n, and $R^4$ are the same as described above.

The pyrrolecarboxylic acid derivative represented by the formula (3) in the production of the pyrrole-imidazole (poly)amide of the present invention is preferably in an isolated state by removing the condensing agent contained in the step of producing the pyrrolecarboxylic acid derivative represented by the formula (3).

The method for isolating the pyrrolecarboxylic acid derivative represented by the formula (3) is not particularly restricted, examples thereof include extraction, washing, and crystallization, and at least washing or crystallization may be preferably included.

The pyrrolecarboxylic acid derivative in the case where n in the formula (3) is 0 is preferably the pyrrolecarboxylic acid derivative compound represented by the following formula (3-1-1) or the formula (3-1-2).

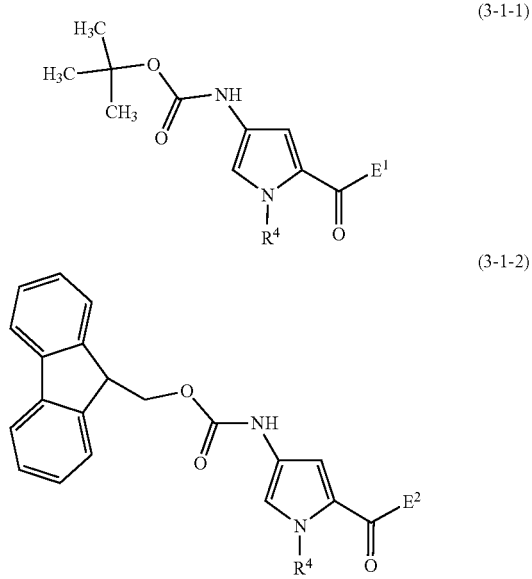

(3-1-1)

(3-1-2)

In the formula (3-1-1) and (3-1-2), $R^4$ is the same as the above, $E^1$ is any one selected from the formulas (31), (34), (35), and (36), and $E^2$ is any one selected from the formulas (31), (33), (34), and (35), and * represents a bond.

The pyrrolecarboxylic acid derivative in the case where n in the formula (3) is 0 is also preferably a solid pyrrolecarboxylic acid derivative compound represented by the following formula (3-2-1) or the formula (3-2-2).

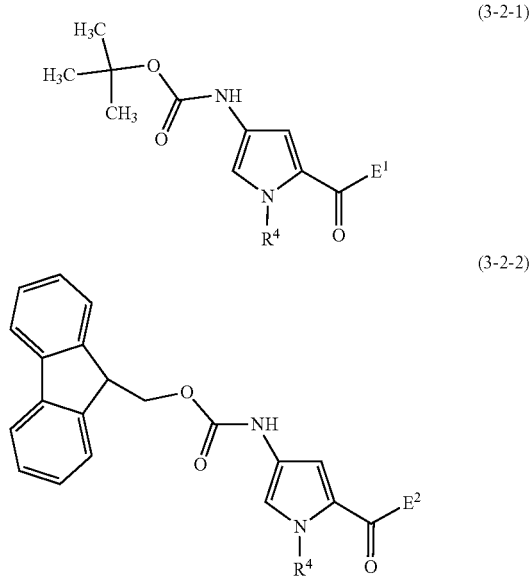

(3-2-1)

(3-2-2)

In the formulas (3-2-1) and the formula (3-2-2), $E^1$, $E^2$ and $R^4$ are the same as described above.

$E^1$ is preferably represented by the formula (35). When $E^1$ is represented by the formula (35), an amide bond can be formed in a higher yield. In addition, since the reactivity is further increased, an amide bond can be formed in a higher yield and in a shorter reaction time.

$E^2$ is preferably any one selected from the formula (33) or the formula (35), more preferably the formula (35). When $E^2$ is any one selected from the formula (33) or the formula (35), an amide bond can be formed in a higher yield. Further, when $E^2$ is represented by the formula (35), the reactivity is further increased, and an amide bond can be formed in a higher yield and in a shorter reaction time.

The method for precipitating the solid of the pyrrolecarboxylic acid derivative compound represented by the formulas (3-2-1) and (3-2-2) is not particularly restricted. For example, the following methods (a) to (d) can be exemplified.

(a) A method for precipitating a solid by cooling the solution containing the pyrrolecarboxylic acid derivative compound represented by the formula (3-1-1) or the formula (3-1-2).

(b) A method for precipitating a solid by concentrating the solution containing the pyrrolecarboxylic acid derivative compound represented by the formula (3-1-1) or the formula (3-1-2).

(c) A method for precipitating a solid by adding a poor solvent to the solution containing the pyrrolecarboxylic acid derivative compound represented by the formula (3-1-1) or the formula (3-1-2).

(d) A method for precipitating a solid by concentrating and substituting the solution containing the pyrrolecarboxylic acid derivative compound represented by the formula (3-1-1) or the formula (3-1-2) with a poor solvent.

The methods (a) to (d) may be used in combination to precipitate the solid. Further, a seed solid may be added to precipitate a solid.

By using the pyrrolecarboxylic acid derivative precipitated as a solid in the production of the pyrrole-imidazole (poly)amide of the present invention, the reaction time can be shortened and a quality of the obtained pyrrole-imidazole (poly)amide also become improved.

Tertiary Amine

In the reaction between the aminoimidazole carboxylic acid derivative and the pyrrolecarboxylic acid derivative of the present invention, a tertiary amine may be added in order to further accelerate the reaction.

Examples of the tertiary amine described above include trimethylamine, triethylamine, tripropylamine, tributylamine, trypentylamine, trihexylamine, triheptylamine, trioctylamine, tridodecylamine, dodecyldimethylamine, hexyldibutylamine, diisopropylbutylamine, diisopropylethylamine, dimethylethylamine, dicyclohexylmethylamine, N,N-dimethylbenzylamine, N-methylpyrrolidin, N,N-dimethyl-4-aminopyridine, quinuclidine, N-methylmorpholin, 1,4-diazabicyclo[2,2,2]octane, and 1,8-diazabicyclo[5,4,0]-7-undecene. The tertiary amines may be used alone or in combination of two or more. When the tertiary amines are mixed to use, the mixing ratio is not restricted.

The tertiary amine is preferably triethylamine, tributylamine, diisopropylethylamine, N,N-dimethylbenzylamine, N,N-dimethyl-4-aminopyridine, or N-methylmorpholine, and more preferably the amine represented by the following formula (a).

(a)

In the formula (a), $R^{a1}$ represents a $C_{1-8}$ linear alkyl group, $R^{a2}$ to $R^{a3}$ independently represent a $C_{3-10}$ branched alkyl group, a $C_{4-8}$ linear alkyl group, or a $C_{3-10}$ saturated ring formed by $R^{a2}$ and $R^{a3}$ connected together to form the ring with the nitrogen atom bound to $R^{a2}$ or $R^{a3}$, and the methylene group in the $C_{3-10}$ saturated ring may be replaced with an oxygen atom or —CO—.

Examples of the $C_{1-8}$ linear alkyl group represented by $R^{a1}$ include a methyl group, an ethyl group, an n-propyl group, and an n-butyl group.

Examples of the $C_{3-10}$ branched alkyl group represented by $R^{a2}$ to $R^{a3}$ include an isopropyl group, an isobutyl group, a tert-butyl group, an isopentyl group, a sec-pentyl group, a 1-ethylpropyl group, neopentyl group, and tert-pentyl group.

The branched chain alkyl group represented by $R^{a2}$ to $R^{a3}$ is preferably a $C_{3-6}$ branched chain alkyl group.

Examples of the $C_{4-8}$ linear alkyl group represented by $R^{a2}$ to $R^{a3}$ include an n-butyl group, an n-pentyl group, an n-hexyl group, an n-heptyl group, and an n-octyl group.

The linear alkyl group represented by $R^{a2}$ to $R^{a3}$ is preferably a $C_{4-6}$ linear alkyl group.

Examples of the $C_{3-10}$ saturated ring formed by $R^{a2}$ and $R^{a3}$ connected together with the nitrogen atom bound to $R^{a2}$ and $R^{a3}$ include the followings.

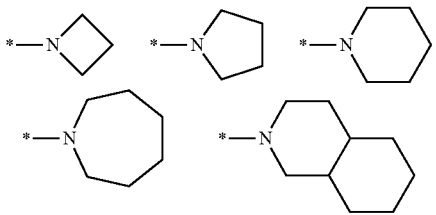

* represents a bond with $R^{a1}$.

The $C_{3-10}$ saturated ring formed by $R^{a2}$ and $R^{a3}$ connected together with the nitrogen atom bound to $R^{a2}$ and $R^{a3}$ is preferably a $C_{3-6}$ saturated ring. Further, one number of the methylene group in the saturated ring is preferably replaced with an oxygen atom or —CO—, and more preferably one number of the methylene group in the saturated ring is replaced with an oxygen atom.

The tertiary amine is more preferably diisopropylethylamine, tributylamine, or N-methylmorpholine.

The amount of use of the tertiary amine used in the production of the pyrrole-imidazole (poly)amide of the present invention per 1 mol of the pyrrolecarboxylic acid derivative represented by the formula (3) is, for example, preferably 0.5 mol or more, more preferably 1.0 mol or more, even more preferably 2.0 mol or more, or even more preferably 3.0 mol or more, and for example, preferably 100 mol or less, more preferably 50 mol or less, and even more preferably 10.0 mol or less.

The amount of substance of the tertiary amine per 1 mol of the pyrrolecarboxylic acid derivative may be hereinafter referred to as "equivalent (eq)" in some cases.

Solvent

The reaction between the aminoimidazole carboxylic acid derivative and the pyrrolecarboxylic acid derivative in the present invention is carried out in the presence of a heterocyclic aromatic compound as a solvent.

Examples of the heterocyclic aromatic compound mentioned include a pyrrole such as pyrrole, 2-methylpyrrole, and 3-methylpyrrole; a pyridine such as 2-methylpyridine, 4-methylpyridine, 2,3-dimethylpyridine, 2,4-dimethylpyridine, 2,5-dimethylpyridine, 2,6-dimethylpyridine, 3,4-dimethylpyridine, and 3,5-dimethylpyridine; and a quinoline such as quinoline. The heterocyclic aromatic compounds may be used alone or in combination of two or more, and the mixing ratio is not particularly restricted.

When a heterocyclic aromatic compound is used as a solvent, the aromatic ring structure in the heterocyclic aromatic compound and the aromatic ring structure in the pyrrolecarboxylic acid derivative cause a π-π interaction, and further, a hydrogen bond is formed between the heteroatom such as a nitrogen atom and an oxygen atom in the heterocyclic aromatic compound and the amino group in the aminoimidazole carboxylic acid derivative. As a result, the conversion rate is rapidly improved and the yield becomes high in the binding reaction between the aminoimidazole carboxylic acid derivative and the pyrrolecarboxylic acid derivative.

Further, as long as a heterocyclic aromatic compound is used as a solvent, a solvent other than the heterocyclic aromatic compound may be used in combination. Examples of the solvent other than the heterocyclic aromatic compound include a saturated hydrocarbon solvent such as n-pentane, n-hexane, cyclohexane, and methylcyclohexane; an aromatic hydrocarbon solvent such as toluene and xylene; a halogen solvent such as chloroform, dichloromethane, chlorobenzene, and dichlorobenzene; an alcohol solvent such as methanol, ethanol, and isopropanol; a ketone solvent such as acetone, methyl ethyl ketone, and acetophenone; an ether solvent such as diethyl ether, methyl tert-butyl ether, tetrahydrofuran, and 1,4-dioxane; an ester solvent such as ethyl acetate, tert-butyl acetate, diethyl carbonate, ethylene carbonate, and propylene carbonate; a nitrile such as acetonitrile; an amid such as N,N-dimethylformamide, N,N-dimethylacetamide, and N-methylpyrrolidone; a sulfur-containing solvent such as dimethylsulfoxid; and N,N-dimethylformamide and N,N-dimethylacetamide are preferable as the solvent. The solvent other than the heterocyclic aromatic compound may be used alone or in combination of two or more, and the mixing ratio is not particularly restricted.

When a solvent other than the heterocyclic aromatic compound is used, the amount of use of the solvent other than the heterocyclic aromatic compound to 100 parts by mass of the heterocyclic aromatic compound as a solvent is, for example, 150 parts by mass or less, preferably 140 parts by mass or less, and more preferably 120 parts by mass or less.

Since the heterocyclic aromatic compound mentioned is used as a solvent, the melting point of the compound is, for example, preferably 0° C. or lower, and more preferably −10° C. or lower.

The heterocyclic aromatic compound mentioned above is preferably a pyridine compound such as pyridine, 2-methylpyridine and 4-methylpyridine, and more preferably pyridine.

In the production of the pyrrole-imidazole (poly)amide of the present invention, the amount of use of the heterocyclic aromatic compound to 1 part by mass of the pyrrolecarboxylic acid derivative represented by the formula (3) is, for example, preferably 1 part by mass or more, more preferably 1.5 parts by mass or more, even more preferably 2 parts by mass or more, and for example, preferably 500 parts by mass or less, more preferably 400 parts by mass or less, and even more preferably 300 parts by mass or less.

By using a heterocyclic aromatic compound as a solvent in the reaction between the aminoimidazole carboxylic acid derivative and the pyrrolecarboxylic acid derivative, the conversion rate to the pyrrole-imidazole (poly)-amide and the yield of the pyrrole-imidazole (poly)amide become improved, and the reproducibility also becomes high.

Synthesis of pyrrole-imidazole (poly)amide

The reaction between the aminoimidazole carboxylic acid derivative represented by the formula (1) and the pyrrole-carboxylic acid derivative represented by the formula (3) is, in short, the synthetic reaction of the pyrrole-imidazole (poly)amide by allowing the imidazole having an amino group to act on the compound in which the OH of the carboxy group bonding to pyrrole is replaced with the leaving group in the presence of the heterocyclic aromatic compound as a solvent to form an amide bond between the carboxy group bonding to pyrrole and the amino group bonding to imidazole.

The temperature at which the aminoimidazole carboxylic acid derivative and the pyrrolecarboxylic acid derivative are reacted is not particularly restricted. The temperature is, for example, 0° C. or higher, preferably 10° C. or higher, more preferably 15° C. or higher, and for example, 100° C. or lower, preferably 80° C. or lower, more preferably 50° C. or lower.

The time for reacting the aminoimidazole carboxylic acid derivative with the pyrrolecarboxylic acid derivative may be appropriately set according to the structure of the aminoimidazole carboxylic acid derivative and the pyrrolecarboxylic acid derivative, the type of the heterocyclic aromatic compound, and the reaction temperature. The time for reaction is, for example, 0.5 hours or more, preferably 1 hour or more, more preferably 5 hours or more, and for example, 96 hours or less, preferably 84 hours or less, more preferably 72 hours or less.

Further, the order of addition of the aminoimidazole carboxylic acid derivative, the pyrrolecarboxylic acid derivative, the heterocyclic aromatic compound, and the tertiary amine used as necessary in synthesizing the pyrrole-imidazole (poly)amide is not particularly restricted, and for example, the tertiary amine may be added to the solution to which the aminoimidazole carboxylic acid derivative and the heterocyclic aromatic compound have already been added, and then the pyrrolecarboxylic acid derivative may be added.

Pyrrole-imidazole (poly)amide

The pyrrole-imidazole (poly)amidepyrrole synthesized by reacting the pyrrolecarboxylic acid derivative of the present invention with the aminoimidazole carboxylic acid derivative, that is, by reacting the carboxy group bonding to pyrrole and the amino group bonding to imidazole to form an amide bond is represented by the following formula (6).

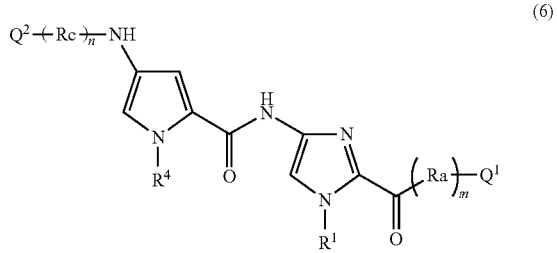

(6)

In the formula (6), Ra, Rc, $Q^1$, $Q^2$, $R^1$, $R^4$, m, and n are the same as described above.

Specific examples and preferable ranges of Ra, Rc, $Q^1$, $Q^2$, $R^{1'}$ and $R^4$ in the pyrrole-imidazole (poly)amide represented by the formula (6) are the same as described above.

The pyrrole-imidazole (poly)amide obtained in the synthesis may be isolated and purified as needed. A common separation method can be used preferably in combination, and the method may be, for example, extraction, concentration, crystallization and column chromatography.

The present application claims the benefit of priority to Japanese patent application No. 2019-063936 filed on Mar. 28, 2019. The entire contents of the specification of Japanese patent application No. 2019-063936 filed on Mar. 28, 2019 are incorporated herein by reference.

EXAMPLES

The present invention is hereinafter described in more detail with reference to examples, but the present invention is not restricted by the following examples, carried out with appropriate modifications made to the extent adaptable to the gist of the above and the following description, and all of them are included in the technical scope of the present invention.

Synthesis Example 1: Production of Aminoimidazole Carboxylic Acid Derivative

Synthesis Example 1-1: Production of 4-amino-1-methylimidazole-2-carboxylic acid ethyl ester hydrochloride Dichloromethane (8 mL), N, N-dimethyl-4-aminopyridine (hereinafter referred to as DMAP; 0.1 g, 0.8 mmol) and 1-ethyl-3-(3-dimethylaminopropyl) carbodiimide hydrochloride (hereinafter referred to as EDC hydrochloride; 1.0 g, 5.0 mmol) were added to 4-[(tert-butoxycarbonyl)amino]-1-methylimidazol-2-carboxylic acid (1.0 g, 4.2 mmol), and the mixture was stirred in an ice bath for 15 minutes. Subsequently, ethanol (hereinafter referred to as EtOH; 1.9 g, 41.5 mmol) was added, and the mixture was stirred for 20 hours. Then, the mixture was washed with 5% aqueous sodium carbonate solution (10 mL) three times and 5% aqueous potassium hydrogen sulfate solution (10 mL) one time, dried over sodium sulfate, and filtered. The obtained solution was concentrated under reduced pressure at 30° C. to obtain 4-[(tert-butoxycarbonyl)amino]-1-methylimidazole-2-carboxylic acid ethyl ester (0.9 g, 3.4 mmol, yield: 81%).

Then, 4-[(tert-butoxycarbonyl)amino]-1-methylimidazole-2-carboxylic acid ethyl ester obtained above (0.5 g, 1.7 mmol) was added to 14% HCl/dioxane (8.7 g, 33.7 mmol), and the mixture was stirred at room temperature for 15 hours. The reaction solution was concentrated under reduced pressure at 30° C., hexane (10 mL) and dichloromethane (10 mL) were added to the obtained solid and mixed, and then the mixture was further stirred in an ice bath for 1 hour. The precipitate was collected by filtration, dried in vacuo at 30° C. to obtain the target product (0.3 g, 1.6 mmol, yield: 96.7%).

Synthesis Example 1-2: Production of 4-amino-1-methylimidazole-2-carboxylic acid 4-nitrobenzyl ester hydrochloride N, N-Dimethylformamide (hereinafter referred to as DMF; 100 mL), $H_2O$ (17 mL) and $Cs_2CO_3$ (7.2 g, 22.0 mmol) were added to 4-[(tert-butoxycarbonyl)amino]-1-methylimidazole-2-carboxylic acid (10.0 g, 41.5 mmol), and the mixture was stirred at 40° C. for 30 minutes. Subsequently, 4-nitrobenzyl bromide (10.2 g, 47.3 mmol) was added, and the mixture was stirred for 29 hours. Then, the reaction solution was added to H₂O (500 mL) in an ice bath, and the mixture was stirred for 30 minutes. The obtained precipitate was collected by filtration and dried in vacuo at 50° C. to obtain 4-[(tert-butoxycarbonyl)amino]-1-methyl-imidazole-2-carboxylic acid 4-nitrobenzyl ester (11.3 g, 30.3 mmol, yield: 73.0%).

Then, 4-[(tert-butoxycarbonyl)amino]-1-methylimidazol-2-carboxylic acid 4-nitrobenzyl ester obtained above (11.3 g, 30.0 mmol) was added to 14% HCl/dioxane (117.2 g, 450 mmol), and the mixture was stirred at room temperature for 22 hours. Then hexane (112.9 g) was added dropwise at room temperature and mixed. After further stirring in an ice bath for 1 hour, the precipitate was collected by filtration and dried in vacuo at 40° C. to obtain the target product (9.6 g, 30.0 mmol, yield: 100%).

Synthesis Example 2, Example 1: Production of pyrrolecarboxylic acid Derivative

Synthesis Example 2-1: Production of Boc-Py-OBt, Referred to as pyrrolecarboxylic acid Derivative Represented by Formula (3-A)

Dichloromethane (15 mL), 1-hydroxybenzotriazole (hereinafter referred to as HOBt; 0.9 g, 6.0 mmol)-H₂O and EDC hydrochloride (1.2 g, 6.0 mmol) were added to 4-[(tert-butoxycarbonyl)amino]-1-methylpyrrole-2-carboxylic acid (1.2 g, 5.0 mmol), and the mixture was stirred at room temperature for 1.5 hours. Then, dichloromethane (5 mL) was added, and EDC was removed by washing with H₂O (15 mL) three times. The obtained organic layer was dried over sodium sulfate, filtered, and concentrated under reduced pressure at 35° C. to obtain the target product (1.8 g, 5.0 mmol, yield: 99.2%).

the precipitate was collected by filtration and dried in vacuo at 50° C. to obtain the target product (14.1 g, 36.6 mmol, yield: 87.8%).

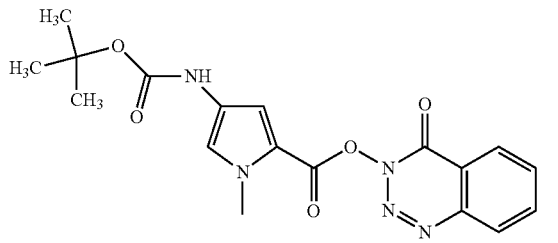
(3-B)

Synthesis Example 2-2: Production of Boc-Py-OAt, Referred to as Pyrrolecarboxylic Acid Derivative Represented by Formula (3-C)

Dichloromethane (15 mL), 1-hydroxy-7-azabenzotriazole (hereinafter referred to as HOAt; 0.8 g, 6.0 mmol) and EDC hydrochloride (1.2 g, 6.0 mmol) were added to 4-[(tert-butoxycarbonyl)amino]-1-methylpyrrole-2-carboxylic acid (1.2 g, 5.0 mmol), and the mixture was stirred at room temperature for 1.5 hours. Then, H₂O (20 mL) was added, and the mixture was concentrated under reduced pressure at 30° C. Tetrahydrofuran (hereinafter referred to as THF; 5 mL) was added, and the mixture was stirred. The precipitate was collected by filtration, and dried in vacuo at 30° C. to obtain the target product (1.7 g, 4.8 mmol, yield: 96.6%).

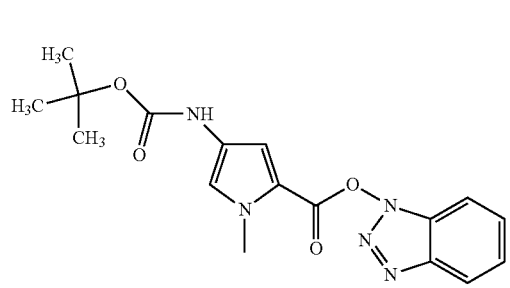
(3-A)

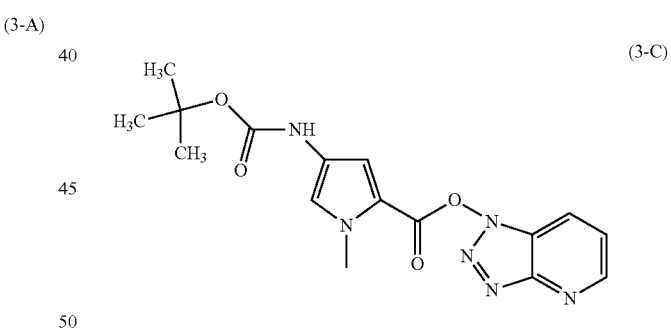
(3-C)

Example 1-1: Production of Boc-Py-OOBt, Referred to as Pyrrolecarboxylic Acid Derivative Represented by Formula (3-B)

Dichloromethane (125 mL), 3,4-dihydro-3-hydroxy-4-oxo-1,2,3-benzotriazine (hereinafter referred to as HOOBt; 8.2 g, 50.0 mmol) and EDC hydrochloride (9.6 g, 50.0 mmol) were added to 4-[(tert-butoxycarbonyl)amino]-1-methylpyrrole-2-carboxylic acid (10.0 g, 41.6 mmol), and the mixture was stirred at room temperature for 1.5 hours. EDC was then removed by washing with H₂O (200 mL) three times. The obtained organic layer was dried over sodium sulfate, filtered, and concentrated under reduced pressure at 40° C. to obtain 16.6 g of concentrate. Next, 50.0 g of ethyl acetate was added, and the mixture was heated to 70° C. and then cooled to 5° C. with stirring. After 1 hour, Example 1-2: Production of Boc-Py-OSu, Referred to as Pyrrolecarboxylic Acid Derivative Represented by Formula (3-D)

Dichloromethane (9 mL), N-hydroxysuccinimide (HOSu; 0.4 g, 3.6 mmol) and EDC hydrochloride (0.7 g, 3.6 mmol) were added to 4-[(tert-butoxycarbonyl)amino]-1-methylpyrrole-2-carboxylic acid (0.7 g, 3.0 mmol), and the mixture was stirred at room temperature for 2 hours. Then, dichloromethane (5 mL) was added, and EDC was removed by washing with H₂O (9 mL) three times. The obtained organic layer was dried over sodium sulfate, filtered and concentrated under reduced pressure at 30° C. to obtain the target product (1.0 g, 2.7 mmol, yield: 88.6%).

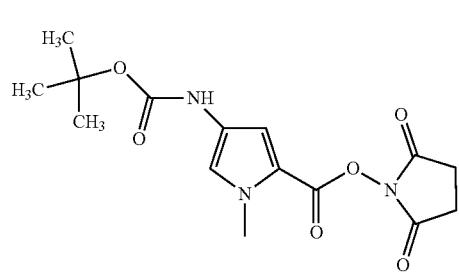

(3-D)

Example 1-3: Production of Boc-Py-O(Oxyma), Referred to as Pyrrolecarboxylic Acid Derivative Represented by Formula (3-E)

Dichloromethane (60 mL), ethyl cyano (hydroxyimino) acetate (hereinafter referred to as Oxyma; 3.4 g, 24.0 mmol) and EDC hydrochloride (4.6 g, 24.0 mmol) were added to 4-[(tert-butoxycarbonyl)amino]-1-methylpyrrole-2-carboxylic acid (4.8 g, 20.0 mmol), and the mixture was stirred at room temperature for 1 hour. EDC was then removed by washing with $H_2O$ (80 mL) three times. The obtained organic layer was dried over sodium sulfate, filtered and concentrated under reduced pressure at 30° C. to obtain the target product (7.4 g, 20 mmol, yield: 100%).

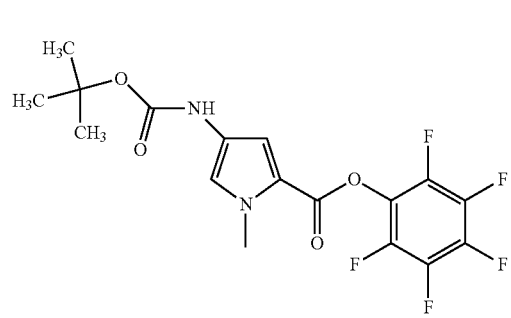

(3-F)

Example 1-5: Production of Fmoc-Py-OAt, Referred to as Pyrrolecarboxylic Acid Derivative Represented by Formula (3-G)

Dichloromethane (15 mL), HOAt (0.8 g, 6.0 mmol), and EDC hydrochloride (1.2 g, 6.0 mmol) were added to 4-[(9-fluorenylmethoxycarbonyl)amino]-1-methylpyrrole-2-carboxylic acid (1.8 g, 5.0 mmol), and the mixture was stirred at room temperature for 1 hour. Then the mixture was concentrated under reduced pressure at 30° C., and THF (15 mL) and $H_2O$ (30 mL) were added, and the mixture was stirred. The obtained solid was collected by filtration and dried at 30° C. to obtain the target product (2.0 g, 4.1 mmol, yield: 82%).

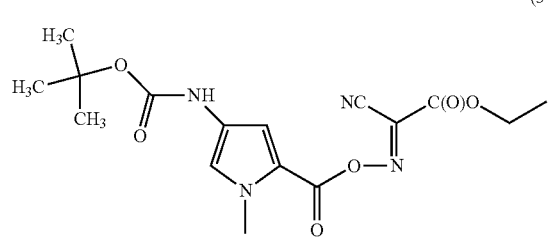

(3-E)

Example 1-4: Production of Boc-Py-OPFP, Referred to as Pyrrolecarboxylic Acid Derivative Represented by Formula (3-F)

Dichloromethane (15 mL), pentafluorophenol (hereinafter referred to as HOPFP; 1.1 g, 6.0 mmol) and EDC hydrochloride (1.2 g, 6.0 mmol) were added to 4-[(tert-butoxycarbonyl)amino]-1-methylpyrrole-2-carboxylic acid (1.2 g, 5.0 mmol), and the mixture was stirred at room temperature for 4 hours. EDC was then removed by washing with $H_2O$ (15 mL) three times. The obtained organic layer was dried over sodium sulfate, filtered and concentrated under reduced pressure at 30° C. to obtain the target product (2.0 g, 5.0 mmol, yield: 100%).

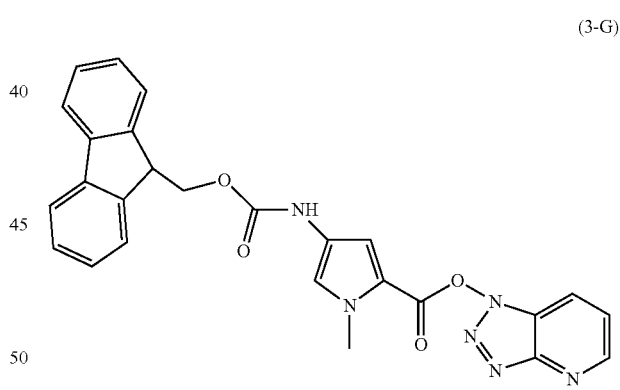

(3-G)

Example 1-6: Production of Fmoc-Py-O(Oxyma) Referred to as Pyrrolecarboxylic Acid Derivative Represented by Formula (3-H)

Dichloromethane (75 mL), Oxyma (4.3 g, 30.0 mmol) and EDC hydrochloride (5.7 g, 30.0 mmol) were added to 4-[(9-fluorenylmethoxycarbonyl)amino]-1-methylpyrrole-2-carboxylic acid (6.0 g, 25.0 mmol), and the mixture was stirred at room temperature for 1 hour. EDC was then removed by washing with $H_2O$ (50 mL) three times. The obtained organic layer was dried over sodium sulfate, filtered and concentrated under reduced pressure at 30° C. to obtain the target product (9.2 g, 25 mmol, yield: 100%).

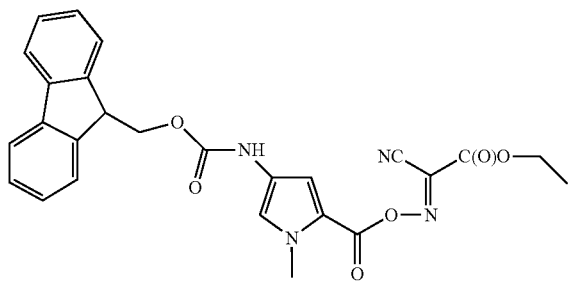

(3-H)

Comparative Example 1: Production of ethyl 4-[(tert-butoxy)carbonylamino]-1-methylpyrrole-2-(4-carboxamide-1-methylimidazole)-2-carboxylate; replication study of Example 11 described in Patent Document 1

DMF (0.2 mL), HOBt-H₂O (55.1 mg, 0.36 mmol) and dicyclocarbodiimide (hereinafter referred to as DCC; 74.3 mg, 0.36 mmol) were added to 4-[(tert-butoxycarbonyl)amino]-1-methylpyrrole-2-carboxylic acid (72.1 mg, 0.3 mmol), and the solution was stirred for 24 hours. Then, the by-product of dicyclohexylurea (hereinafter referred to as DCU) was removed by filtration. Separately, DMF (0.2 mL), diisopropylethylamine (hereinafter referred to as DIPEA; 166.7 mg, 1.29 mmol) were added to 4-amino-1-methylimidazole-2-carboxylic acid ethyl ester hydrochloride (74.0 mg, 0.36 mmol) to be dissolved. Then, the obtained Boc-Py-OBt/DMF solution was added, and the mixed solution was stirred at 37° C. for 48 hours. The reaction solution was added dropwise to H₂O (10 mL) in an ice bath. The resulting precipitate was collected by filtration and dried in vacuo at 30° C. to obtain target product (52.2 mg, 0.13 mmol, yield: 44.4%).

Comparative Example 2: Production of ethyl 4-[(tert-butoxy)carbonylamino]-1-methylpyrrole-2-(4-carboxamide-1-methylimidazole)-2-carboxylate; amidation reaction in DMF solvent using isolated Boc-Py-OBt DMF (0.4 mL) and DIPEA (166.7 mg, 1.29 mmol) were added to 4-amino-1-methylimidazole-2-carboxylic acid ethyl ester hydrochloride (74.0 mg, 0.36 mmol) and dissolved. Then isolated solid Boc-Py-OBt (107.2 mg, 0.3 mmol) was added, and the mixed solution was stirred at 37° C. for 24 hours. The reaction solution was added dropwise to H₂O (10 mL) in an ice bath, and the resulting precipitate was collected by filtration and dried in vacuo at 30° C. to obtain the target product as a solid (49.8 mg, 0.13 mmol, yield: 42.4%).

Example 2: Production of ethyl 4-[(tert-butoxy)carbonylamino]-1-methylpyrrole-2-(4-carboxamide-1-methylimidazole)-2-carboxylate; Amidation Reaction in Pyridine Solvent Using Isolated Boc-Py-OBt Pyridine (0.4 mL) and DIPEA (166.7 mg, 1.29 mmol) were added to 4-amino-1-methylimidazole-2-carboxylic acid ethyl ester hydrochloride (74.0 mg, 0.36 mmol) and dissolved. Then, isolated solid Boc-Py-OBt (107.2 mg, 0.3 mmol) was added, and the mixture was stirred at 37° C. for 24 hours. The reaction liquid was then cooled to 20° C., and dichloromethane (10 mL) was added. Subsequently, the solution was washed with 5% aqueous sodium carbonate solution (10 mL) three times, H₂O (10 mL) one time and 5% aqueous potassium hydrogen sulfate solution (10 mL) one time, dried over sodium sulfate, filtrated, and the obtained solution was concentrated under reduced pressure at 30° C. to obtain the target product as a concentrate (152.6 mg, 0.23 mmol, pure content: 90.8 mg, yield: 77.3%).

The reaction was highly reproducible, and the equivalent yields were achieved when the reactions were replicated.

Example 3: Production of 4-[(tert-butoxy)carbonylamino]-1-methylpyrrole-2-(4-carboxamide-1-methylimidazole)-2-carboxylic acid 4-nitrobenzyl ester; Amidation Reaction in Pyridine Solvent, Using Isolated Boc-Py-OBt Pyridine (0.4 mL) and DIPEA (166.7 mg, 1.29 mmol) were added to 4-amino-1-methylimidazole-2-carboxylic acid 4-nitrobenzyl ester hydrochloride (112.6 mg, 0.36 mmol) and dissolved. Then isolated solid Boc-Py-OBt (107.2 mg, 0.3 mmol) was added, and the mixture was stirred at 37° C. for 35 hours. The reaction solution was then cooled to 20° C., and dichloromethane (5 mL) was added. Subsequently, the solution was washed with 5% aqueous sodium carbonate solution (5 mL) three times, H₂O (5 mL) one time and 5% aqueous potassium hydrogen sulfate solution (5 mL) one time, dried over sodium sulfate, filtered, and the obtained solution was concentrated under reduced pressure at 30° C. to obtain the target product as a concentrate (151.9 mg, 0.18 mmol, pure content: 90.4 mg, yield: 60.4%).

The conversion rates in the reactions of Examples 2 and 3, and Comparative Examples 1 and 2 are shown in FIG. 1.

The conversion rate was calculated by the following formula from each peak area of the high performance liquid chromatography chart.

peak area of product/(peak area of product+peak area of pyrrolecarboxylic acid derivative+peak area of pyrrolecarboxylic acid derivative hydrolyzate)×100

A production method in which the conversion rate becomes 50% or more within 5 hours after the start of a reaction is preferable because of the satisfying conversion rate.

Example 4: Production of 4-[(tert-butoxy)carbonylamino]-1-methylpyrrole-2-(4-carboxamide-1-methylimidazole)-2-carboxylic acid ethyl ester; Amidation Reaction in Pyridine Solvent Using Isolated Boc-Py-OAt Pyridin (0.4 mL) and DIPEA (166.7 mg, 1.29 mmol) were added to 4-amino-1-methylimidazole-2-carboxylic acid ethyl ester hydrochloride (74.0 mg, 0.36 mmol). Then isolated solid Boc-Py-OAt (107.5 mg, 0.3 mmol) was added, and the mixture was stirred at 37° C. for 48 hours. The reaction solution was cooled to 20° C., and dichloromethane (5 mL) was added. Subsequently, the solution was washed with 5% aqueous sodium carbonate solution (5 mL) three times, H₂O (5 mL) one time and 5% aqueous potassium hydrogen sulfate solution (5 mL) one time, dried over sodium sulfate, filtered, and the obtained solution was concentrated under reduced pressure at 30° C. to obtain the target product as a concentrate (101.1 mg, 0.26 mmol, yield: 86.1%).

Example 5: Production of 4-[(tert-butoxy)carbonylamino]-1-methylpyrrole-2-(4-carboxamide-1-methylimidazole)-2-carboxylic acid ethyl ester; Amidation Reaction in Pyridine Solvent Using Isolated Boc-Py-O(Oxyma)

Pyridine (0.4 mL) and DIPEA (166.7 mg, 1.29 mmol) were added to 4-amino-1-methylimidazole-2-carboxylic acid ethyl ester hydrochloride (74.0 mg, 0.36 mmol). Then, isolated solid Boc-Py-O(Oxyma) (109.3 mg, 0.3 mmol) was added, and the mixture was stirred at 37° C. for 7 hours. The reaction solution was cooled to 20° C., dichloromethane (5 mL) was added. Subsequently, the solution was washed with 5% aqueous sodium carbonate solution (5 mL) three times, $H_2O$ (5 mL) one time and 5% aqueous potassium hydrogen sulfate solution (5 mL) one time, dried over sodium sulfate, filtered, and the obtained solution was concentrated under reduced pressure at 30° C. to obtain the target product as a concentrate (100.9 mg, 0.26 mmol, pure content: 90.4 mg, yield: 85.9%).

Figure 2:
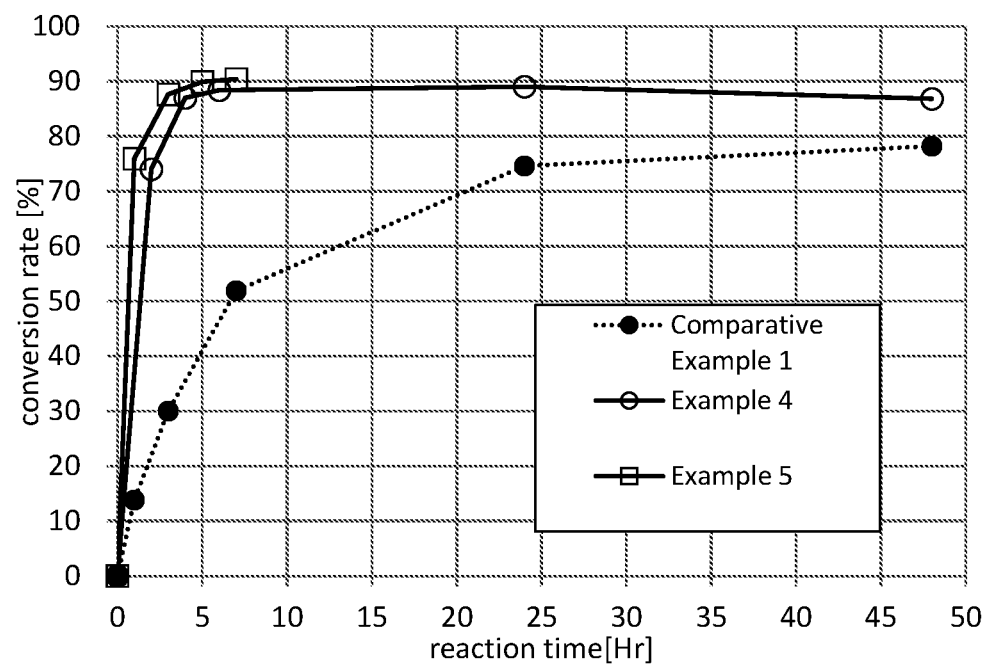
FIG. 2 is a graph showing the conversion rates in the reactions of Examples 4 and 5, and Comparative Example 1.

The conversion rates in the reactions of Examples 4, 5, and Comparative Example 1 are shown in FIG. 2.

Example 6: Production of 4-[(tert-butoxy)carbonylamino]-1-methylpyrrole-2-(4-carboxamide-1-methylimidazole)-2-carboxylic acid ethyl ester; Amidation Reaction in Pyridine/DMF Mixed Solvent Using Isolated Boc-Py-O(Oxyma)

Pyridine (0.2 mL), DMF (0.2 mL) and DIPEA (166.7 mg, 1.29 mmol) were added to 4-amino-1-methylimidazole-2-carboxylic acid ethyl ester hydrochloride (74.0 mg, 0.36 mmol). Then isolated solid Boc-Py-O(Oxyma) (109.3 mg, 0.3 mmol) was added, and the mixture was stirred at 37° C. for 4 hours. The reaction solution was cooled to 20° C., dichloromethane (5 mL) was added. Subsequently, the solution was washed with 5% aqueous sodium carbonate solution (5 mL) three times, $H_2O$ (5 mL) one time and 5% aqueous potassium hydrogen sulfate solution (5 mL) one time, dried over sodium sulfate, filtered, and the obtained solution was concentrated under reduced pressure at 30° C. to obtain the target product as a concentrate (78.4 mg, 0.20 mmol, yield: 66.7%).

Example 7: Production of 4-[(tert-butoxy)carbonylamino]-1-methylpyrrole-2-(4-carboxamide-1-methylimidazole)-2-carboxylic acid ethyl ester; Amidaiton Reaction in Picoline Solvent Using Isolated Boc-Py-O(Oxyma)

To 4-amino-1-methylimidazole-2-carboxylic acid ethyl ester hydrochloride (74.0 mg, 0.36 mmol), 2-picoline (0.4 mL) and DIPEA (166.7 mg, 1.29 mmol) were added. Then, isolated solid Boc-Py-O(Oxyma) (109.3 mg, 0.3 mmol) was added, and the mixture was stirred at 37° C. for 24 hours. The reaction solution was cooled to 20° C., and dichloromethane (5 mL) was added. Subsequently, the solution was washed with 5% aqueous sodium carbonate solution (5 mL) three times, $H_2O$ (5 mL) one time and 5% aqueous potassium hydrogen sulfate solution (5 mL) one time, dried over sodium sulfate, filtered, and the obtained solution was concentrated under reduced pressure at 30° C. to obtain the target product as a concentrate (80.4 mg, 0.21 mmol, yield: 68.4%).

Figure 3:
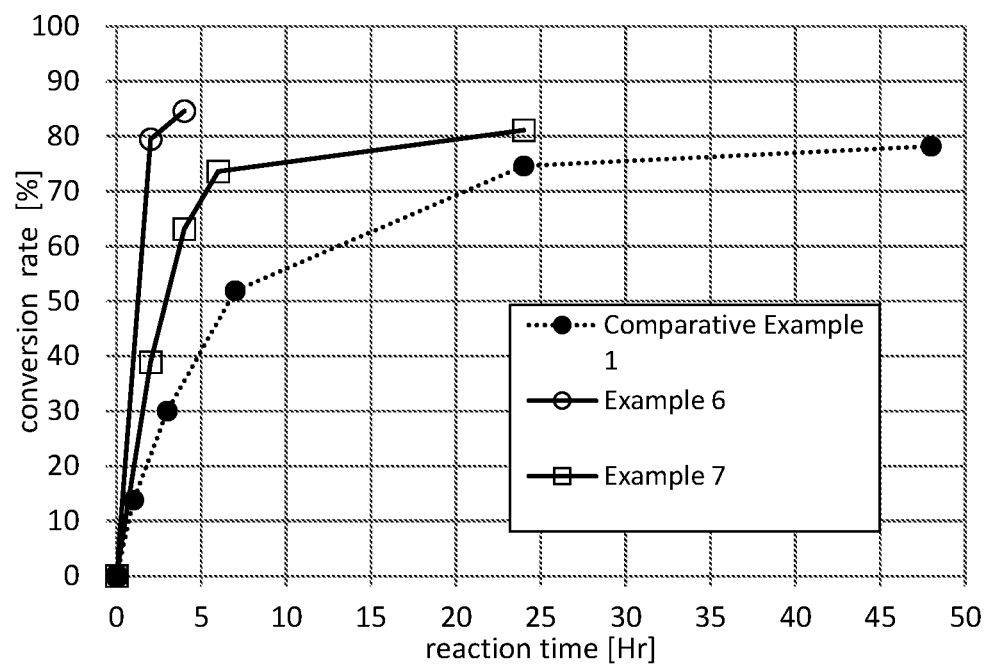
FIG. 3 is a graph showing the conversion rates in the reactions of Examples 6 and 7, and Comparative Example 1.

The conversion rates in the reactions of Examples 6, 7 and Comparative Example 1 are shown in FIG. 3.

Example 8: Production of 4-[(tert-butoxy)carbonylamino]-1-methylpyrrole-2-(4-carboxamide-1-methylimidazole)-2-carboxylic acid ethyl ester; Amidation Reaction in Pyridine Solvent Using Isolated Boc-Py-O(Oxyma) and TEA Pyridine (0.4 mL) and trimethylamine (hereinafter referred to as TEA; 130.5 mg, 1.29 mmol) were added to 4-amino-1-methylimidazole-2-carboxylic acid ethyl ester hydrochloride (74.0 mg, 0.36 mmol). Then, isolated solid Boc-Py-O(Oxyma) (109.3 mg, 0.3 mmol) was added, and the mixture was stirred at 37° C. for 8 hours. The reaction solution was cooled to 20° C., dichloromethane (5 mL) was added. Subsequently, the solution was washed with 5% aqueous sodium carbonate solution (5 mL) three times, $H_2O$ (5 mL) one time and 5% aqueous potassium hydrogen sulfate solution (5 mL) one time, dried over sodium sulfate, filtered, and the obtained solution was concentrated under reduced pressure at 30° C. to obtain the target as a concentrate (93.8 mg, 0.18 mmol, yield: 79.9%).

Example 9: Production of 4-[(tert-butoxy)carbonylamino]-1-methylpyrrole-2-(4-carboxamide-1-methylimidazole)-2-carboxylic acid ethyl ester; Amidation Reaction in Pyridine Solvent Using Isolated Boc-Py-O(Oxyma) and TBA Pyridine (0.4 mL) and tributylamine (hereinafter referred to as TBA; 166.7 mg, 1.29 mmol) were added to 4-amino-1-methylimidazole-2-carboxylic acid ethyl ester hydrochloride (74.0 mg, 0.36 mmol). Then, isolated solid Boc-Py-O(Oxyma) (107.2 mg, 0.3 mmol) was added, and the mixture was stirred at 37° C. for 7 hours. The reaction solution was cooled to 20° C., dichloromethane (5 mL) was added. Subsequently, the solution was washed with 5% aqueous sodium carbonate solution (5 mL) three times, $H_2O$ (5 mL) one time, 5% aqueous potassium hydrogen sulfate solution (5 mL) one time, dried over sodium sulfate, filtered, and the obtained solution was concentrated under reduced pressure at 30° C. to obtain the target product as a concentrate (107.0 mg, 0.27 mmol, yield: 91.1%).

Example 10: Production of 4-[(tert-butoxy)carbonylamino]-1-methylpyrrole-2-(4-carboxamide-1-methylimidazole)-2-carboxylic acid ethyl ester; Amidation Reaction in Pyridine Solvent Using Isolated Boc-Py-O(Oxyma) and NMM Pyridine (0.4 mL) and N-methylmorpholine (hereinafter referred to as NMM; 130.5 mg, 1.29 mmol) were added to 4-amino-1-methylimidazole-2-carboxylic acid ethyl ester hydrochloride (74.0 mg, 0.36 mmol). Then, isolated solid Boc-Py-O(Oxyma) (109.3 mg, 0.3 mmol) was added, and the mixture was stirred at 37° C. for 6 hours. The reaction solution was cooled to 20° C., and dichloromethane (5 mL) was added. Subsequently, the solution was washed with 5% aqueous sodium carbonate solution (5 mL) three times, $H_2O$ (5 mL) one time and 5% aqueous potassium hydrogen sulfate solution (5 mL) one time, dried over sodium sulfate and filtered, and the obtained solution was concentrated under reduced pressure at 30° C. to obtain the target product as a concentrate (109.6 mg, 0.28 mmol, yield: 93.3%).

Figure 4:
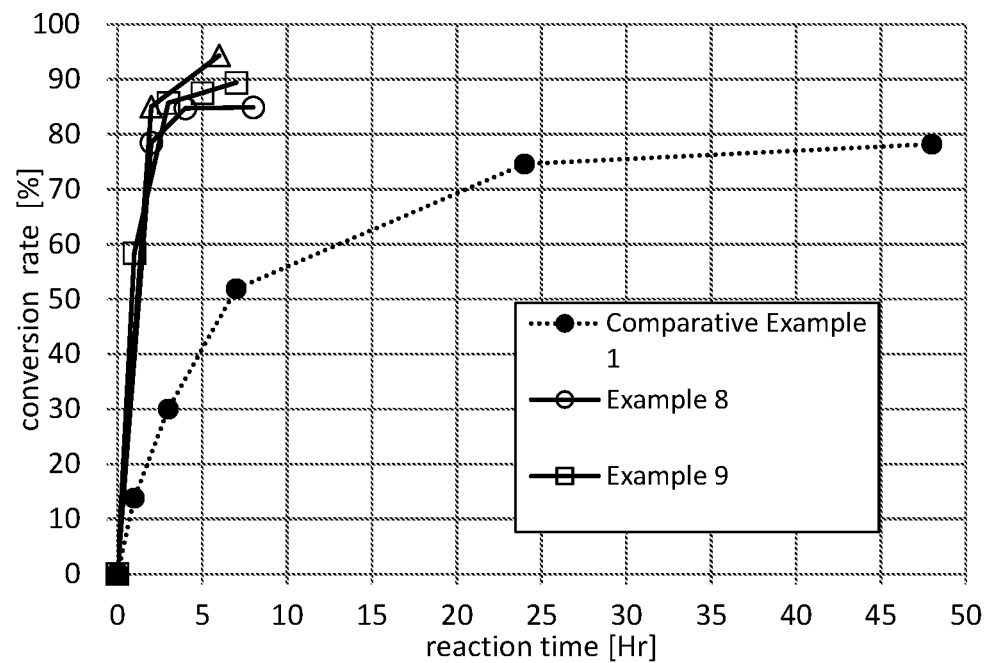
FIG. 4 is a graph showing the conversion rates in the reactions of Examples 8 to 10, and Comparative Example 1.

The conversion rates in the reactions of Examples 8 to 10 and Comparative Example 1 are shown in FIG. 4.

Example 11: Production of 4-[(9-fluorenylmethoxycarbonyl)amino]-1-methylpyrrole-2-(4-carboxamide-1-methylimidazole)-2-carboxylic acid ethyl ester; Amidation Reaction in Pyridine Solvent Using Isolated Fmoc-Py-OAt Pyridine (0.4 mL) and NMM (130.5 mg, 1.29 mmol) were added to 4-amino-1-methylimidazole-2-carboxylic acid ethyl ester hydrochloride (74.0 mg, 0.36 mmol). Then, isolated solid Fmoc-Py-OAt (144.1 mg, 0.3 mmol) was added, and the mixture was stirred at 37° C. for 4 hours. The reaction solution was cooled to 20° C., dichloromethane (15 mL) was added. Subsequently, the solution was washed with 5% aqueous sodium carbonate solution (5 mL) three times, $H_2O$ (5 mL) one time and 5% aqueous potassium hydrogen sulfate solution (5 mL) one time, dried over sodium sulfate and filtered, and the obtained solution was concentrated under reduced pressure at 30° C. to obtain the target product as a concentrate (139.2 mg, 0.27 mmol, yield: 90.3%).

Example 12: Production of 4-[(9-fluorenylmethoxycarbonyl)amino]-1-methylpyrrole-2-(4-carboxamide-1-methylimidazole)-2-carboxylic acid ethyl ester; Amidation Reaction in Pyridine Solvent Using Isolated Fmoc-Py-O(Oxyma)

Pyridine (0.4 mL) and NMM (130.5 mg, 1.29 mmol) were added to 4-amino-1-methylimidazole-2-carboxylic acid ethyl ester hydrochloride (74.0 mg, 0.36 mmol). Then isolated solid Fmoc-Py-O(Oxyma) (145.9 mg, 0.3 mmol) was added, and the mixture was stirred at 37° C. for 4 hours. The reaction solution was cooled to 20° C., dichloromethane (15 mL) was added. Subsequently, the solution was washed with 5% aqueous sodium carbonate solution (5 mL) three times, $H_2O$ (5 mL) one time and 5% aqueous potassium hydrogen sulfate solution (5 mL) one time, dried over sodium sulfate and filtered, and the obtained solution was concentrated under reduced pressure at 30° C. to obtain the target product as a concentrate (106.2 mg, 0.21 mmol, yield: 84.8%).

Figure 5:
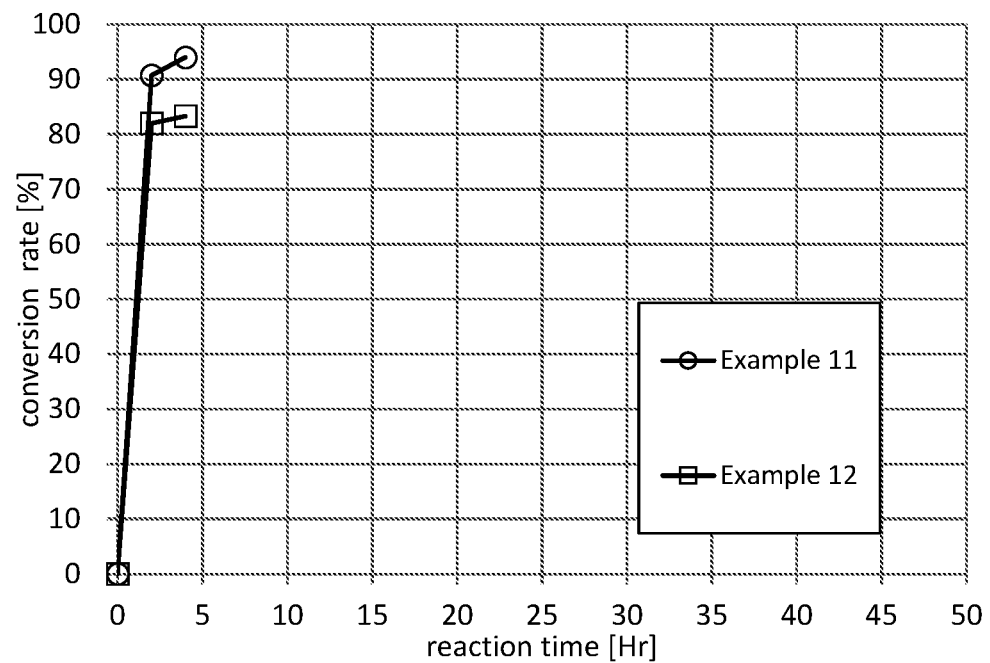
FIG. 5 is a graph showing the conversion rates in the reactions of Examples 11 and 12.

The yields in the reactions of Examples 11 and 12 are shown in FIG. 5.

Example 13: Production of 4-[(tert-butoxy)carbonylamino]-1-methylpyrrole-2-(4-carboxamide-1-methylimidazole)-2-carboxylic acid 4-nitrobenzyl ester; Amidation Reaction in Pyridine Solvent Using Isolated Boc-Py-O(Oxyma)

Pyridine (0.4 mL) and DIPEA (166.7 mg, 1.29 mmol) were added to 4-amino-1-methylimidazole-2-carboxylic acid 4-nitrobenzyl ester hydrochloride (112.6 mg, 0.36 mmol). Then, isolated solid Boc-Py-O(Oxyma) (109.3 mg, 0.3 mmol) was added and the mixture was stirred at 37° C. for 8 hours. The reaction solution was cooled to 20° C., and dichloromethane (5 mL) was added. Subsequently, the solution was washed with 5% aqueous sodium carbonate solution (5 mL) three times, $H_2O$ (5 mL) one time and 5% aqueous potassium hydrogen sulfate solution (5 mL) one time, dried over sodium sulfate and filtered, and the obtained solution was concentrated under reduced pressure at 30° C. to obtain the target product as a concentrate (112.2 mg, 0.18 mmol, yield: 75.0%).

Figure 6:
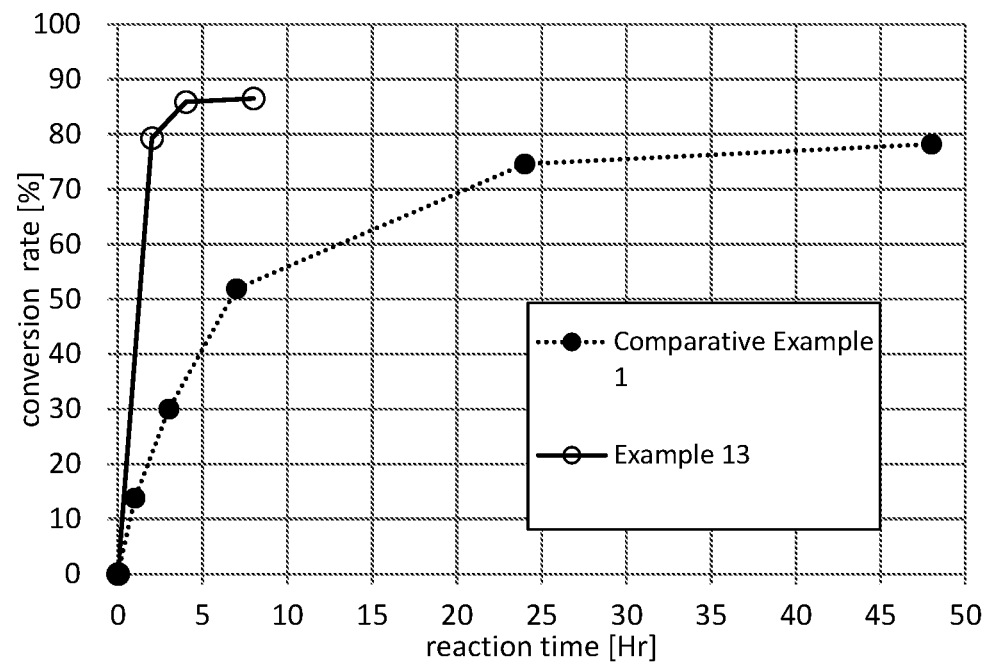
FIG. 6 is a graph showing the conversion rates in the reactions of Example 13 and Comparative Example 1.

The yields in the reactions of Example 13 and Comparative Example 1 are shown in FIG. 6.

Example 14: Production of 4-[(tert-butoxy)carbonylamino]-1-methylpyrrole-2-(4-carboxamide-1-methylimidazole)-2-carboxylic acid ethyl ester; Amidation Reaction in Pyridine Solvent Using Isolated Boc-Py-O(Oxyma)

Pyridine (0.4 mL) and DIPEA (166.7 mg, 1.29 mmol) were added to 4-amino-1-methylimidazole-2-carboxylic acid ethyl ester hydrochloride (74.0 mg, 0.36 mmol). Then, isolated solid Boc-Py-O(Oxyma) (107.2 mg, 0.3 mmol) was added, and the mixture was stirred at room temperature, about 25° C., for 24 hours. Dichloromethane (5 mL) was added to the reaction solution. Then, the solution was washed with 5% aqueous sodium carbonate solution (5 mL) three times, $H_2O$ (5 mL) one time and 5% aqueous potassium hydrogen sulfate solution (5 mL) one time, dried over sodium sulfate and filtered, and the obtained solution was concentrated under reduced pressure at 30° C. to obtain the target product as a concentrate (97.8 mg, 0.25 mmol, yield: 83.3%).

Example 15: Production of 4-[(tert-butoxy)carbonylamino]-1-methylpyrrole-2-(4-carboxamide-1-methylimidazole)-2-carboxylic acid 4-nitrobenzyl ester; Amidation Reaction in Pyridine Solvent Using Isolated Boc-Py-O(Oxyma)

Pyridine (120 mL) and DIPEA (15.5 mg, 120 mmol) were added to 4-amino-1-methylimidazole-2-carboxylic acid 4-nitrobenzyl ester hydrochloride (12.5 g, 40.0 mmol). Then, isolated solid Boc-Py-O(Oxyma) (13.1 g, 36.0 mmol) was added, and the mixture was stirred at room temperature, about 25° C., for 32 hours. After the reaction solution was concentrated under reduced pressure at 30° C., dichloromethane (200 mL) was added, washed with $H_2O$ (200 mL) one time, 5% aqueous sodium carbonate solution (200 mL) two times, 5% aqueous potassium hydrogen sulfate solution (200 mL) one time and 20% aqueous sodium chloride solution (200 mL) one time. Then, the solution was dried over sodium sulfate and filtrated, and the obtained solution was concentrated under reduced pressure at 30° C. to obtain the solid target product (16.5 g, 33.1 mmol, yield: 92.0%).

Figure 7:
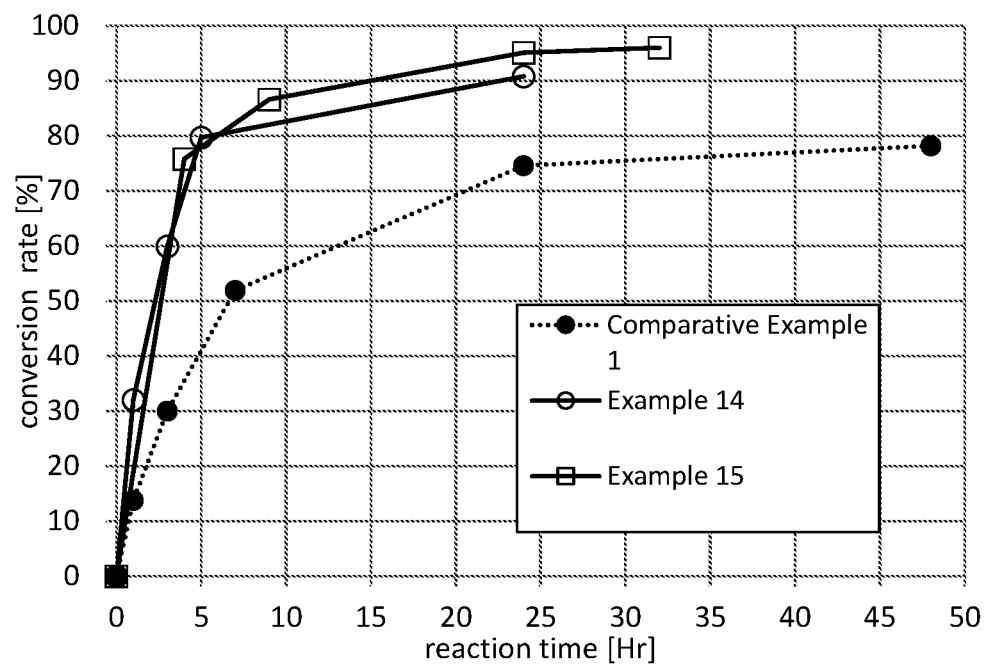
FIG. 7 is a graph showing the conversion rates in the reactions of Examples 14 and 15, and Comparative Example 1.

The conversion rates in the reactions of Examples 14, 15 and Comparative Example 1 are shown in FIG. 7.

Example 16: Production of Boc-Py-Im-(β-Ala)-O(4-NO$_2$Bzl), Referred to as Pyrrole-Imidazole (Poly)Amide Represented by Formula (6-A)

Pyridine (15 mL) and DIPEA (1.9 g, 13.5 mmol) were added to H-Im-(RB-Ala)-O (4-NO$_2$Bzl)-HCl (referred to as aminoimidazole carboxylic acid derivative represented by the formula (1-A); 1.4 g, 3.6 mmol). Then, isolated solid Boc-Py-O(Oxyma) (1.2 g, 3.2 mmol) was added, and the mixture was stirred at room temperature, about 25° C., for 21.5 hours. Dichloromethane (33 mL) was added to the reaction solution, and the mixture was washed with 5% aqueous sodium carbonate solution (22 mL) three times, 5% aqueous potassium hydrogen sulfate solution (44 mL) one time and 20% aqueous sodium chloride solution (44 mL) one time, dried over sodium sulfate and filtrated, and the obtained solution was concentrated under reduced pressure at 30° C. to obtain the target product as a concentrate (1.6 g, 2.8 mmol, yield: 87.5%).

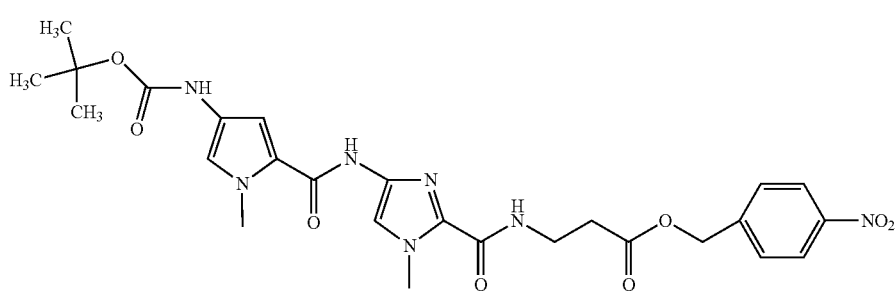

(6-A)

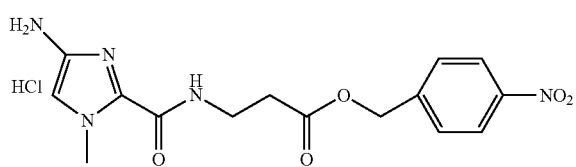

(1-A)

Example 17: Production of Boc-Py-Im-Gaba-O(4-NO₂Bzl) Referred to as Pyrrole-Imidazole (Poly) Amide Represented by Formula (6-B)

Pyridine (16.5 mL) and DIPEA (2.2 g, 16.6 mmol) were added to H-Im-Gaba-O(4-NO₂Bzl)-HCl (referred to as aminoimidazole carboxylic acid derivative represented by the formula (1-B); 2.2 g, 5.5 mmol). Then, isolated solid Boc-Py-O(Oxyma) (2.0 g, 5.5 mmol) was added, and the mixture was stirred at room temperature, about 25° C., for 23 hours. Dichloromethane (23 mL) was added to the reaction solution. The solution was washed with 5% aqueous sodium carbonate solution (20 mL) three times, H₂O (20 mL) one time and 5% aqueous potassium hydrogen sulfate solution (20 mL) one time, dried over sodium sulfate and filtrated, and the obtained solution was concentrated under reduced pressure at 30° C. to obtain the solid target product (2.4 g, 4.2 mmol, yield: 75.6%).

Example 18: Production of Boc-(β-Ala)-Py-Im-OEt Referred to as Pyrrole-Imidazole (Poly)Amide Represented by Formula (6-C)

Pyridine (0.4 mL) and DIPEA (166.7 mg, 1.29 mmol) were added to 4-amino-1-methylimidazole-2-carboxylic acid ethyl ester hydrochloride (74.0 mg, 0.36 mmol). Then, isolated solid Boc-(β-Ala)-Py-O(Oxyma) (referred to as pyrrolecarboxylic acid derivative represented by the formula (3-I); 130.6 mg, 0.3 mmol) was added, and the mixture was stirred at 37° C. for 24 hours. The reaction solution was cooled to 20° C., and dichloromethane (5 mL) was added. Subsequently, the solution was washed 5% aqueous sodium carbonate solution (5 mL) three times, H₂O (5 mL) one time and 5% aqueous potassium hydrogen sulfate solution (5 mL) one time, dried over sodium sulfate and filtered, and the obtained solution was concentrated under reduced pressure at 30° C. to obtain the target product as a concentrate (116.3 mg, 0.25 mmol, yield: 83.8%).

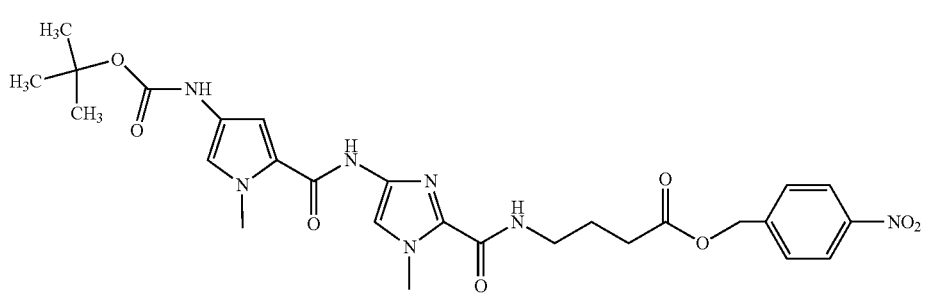

(6-B)

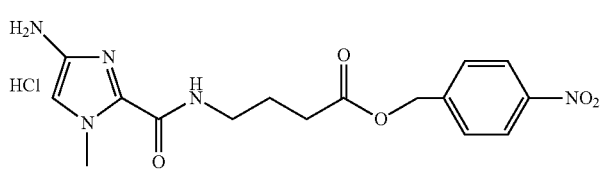

(1-B)

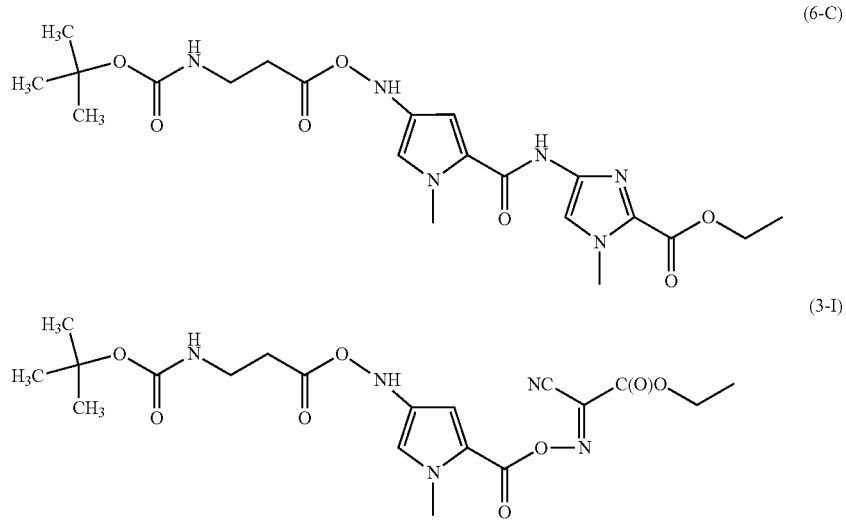

Figure 8:
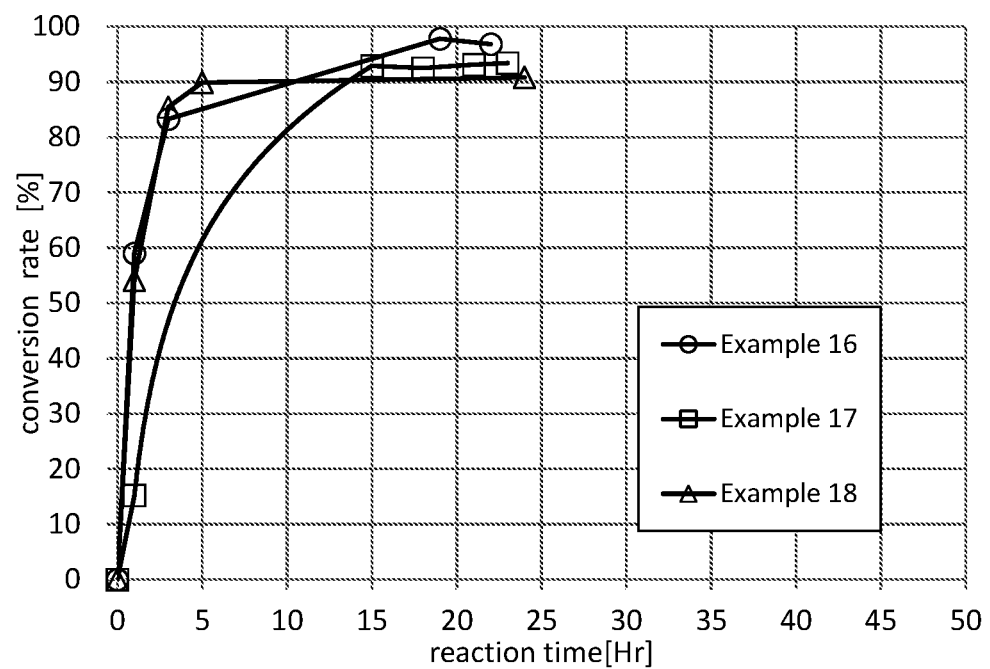
FIG. 8 is a graph showing the conversion rates in the reactions of Examples 16 to 18.

The conversion rates in the reactions of Examples 16 to 18 are shown in FIG. 8.

Example 19: Production of Boc-Py-Im-Py-OEt Referred to as Pyrrole-Imidazole (Poly)Amide Represented by Formula (6-D)

Pyridine (0.3 mL) and NMM (91.0 mg, 0.9 mmol) were added to H-Im-Py-OEt.HCl (referred to as aminoimidazole-pyrrolecarboxylic acid derivative represented by the formula (1-C); 65.6 mg, 0.2 mmol). Then, isolated solid Boc-Py-O (Oxyma) (87.4 mg, 0.24 mmol) was added, and the mixture was stirred at 37° C. for 2.5 hours. After the reaction solution was concentrated, 2-methyl tetrahydrofuran (7.5 mL) was added, then washed with 5% aqueous sodium hydrogen carbonate solution (6 mL) three times, 5% aqueous citric acid solution (6 mL) two times and H₂O (6 mL) one time, dried over sodium sulfate and filtrated, and the obtained solution was concentrated under reduced pressure at 30° C. to obtain the target product (80.3 mg, 0.16 mmol, yield: 78.2%).

Example 20: Production of Boc-Py-Im-Im-OEt Referred to as Pyrrole-Imidazole (Poly)Amide Represented by Formula (6-E)

Pyridine (0.6 mL) and NMM (91.0 mg, 0.9 mmol) were added to H-Im-Im-OEt.HCl (referred to as aminoimidazole-imidazolecarboxylic acid derivative represented by the formula (1-D); 65.8 mg, 0.2 mmol). Then, isolated solid Boc-Py-O(Oxyma) (87.4 mg, 0.24 mmol) was added, and the mixture was stirred at 37° C. for 2.5 hours. After the reaction solution was concentrated, dichloromethane (6 mL) was added, and then the mixture was washed with 5% aqueous sodium hydrogen carbonate solution (6 mL) three times, 5% aqueous citric acid solution (6 mL) two times and H₂O (6 mL) one times, dried over sodium sulfate and filtrated, and the obtained solution was concentrated under reduced pressure at 30° C. to obtain the target product (66.7 mg, 0.13 mmol, yield: 64.9%).

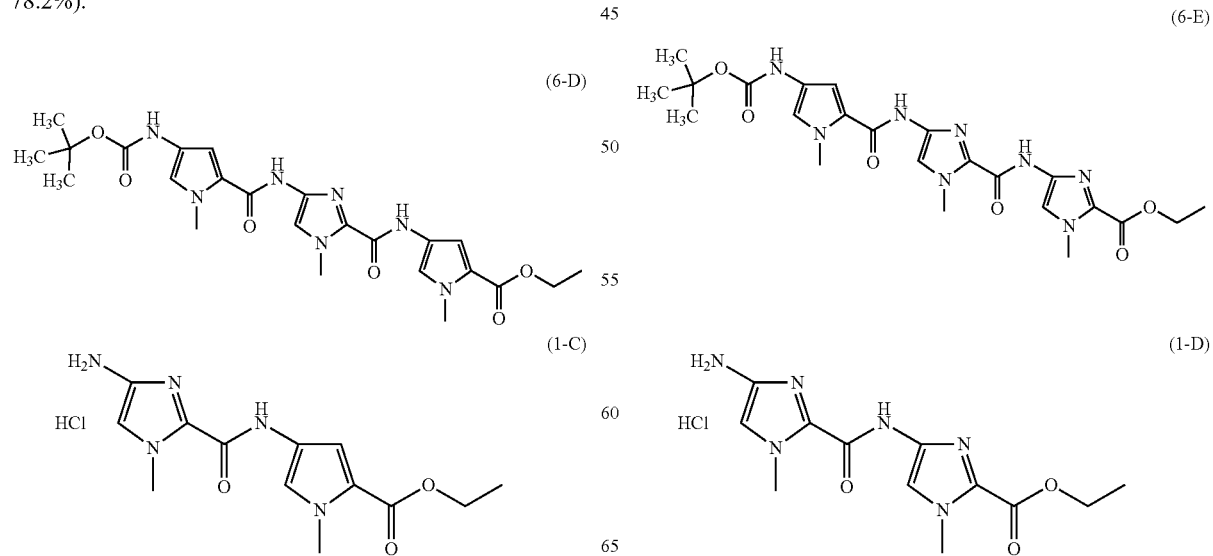

Example 21: Production of Boc-Py-Im-OTag Referred to as Pyrrole-Imidazole (Poly)Amide Represented by Formula (6-F)

Dichloromethane (10 mL), N, N-dimethylaminopyridine (12 mg, 0.1 mmol) and N, N-diisopropylcarbodiimide (0.2 mg, 1.4 mmol) were added to 3,4,5-tri(n-octadecyloxy) benzyl alcohol (0.9 g, 1.0 mmol) and 4-[(9-fluorenyl-methoxycarbonyl)amino]-1-methylimidazole-2-carboxylic acid (0.5 mg, 1.4 mmol), and the mixture was stirred at room temperature for 5.5 hours. After the reaction solution was concentrated under reduced pressure, 80 mL of acetonitrile was added. The resulting precipitate was collected by filtration and dried under reduced pressure to obtain 1.3 g of solid. Dichloromethane (12 mL) and piperidine (0.4 mg, 4.6 mmol) were added to 1.2 g of the obtained solid, and the mixture was reacted at room temperature for 1.5 hours. Then, 60 mL of acetonitrile was added to the reaction solution, and the resulting precipitate was collected by filtration and dried under reduced pressure to obtain H-Im-OTag (referred to as aminoimidazole carboxylic acid derivative represented by the formula (1-E); 0.9 g, 0.9 mmol, yield: 94.0%). Subsequently, NMM (39 mg, 0.4 mmol) and pyridine (0.8 mL) were added to the obtained H-Im-OTag (201 mg, 0.2 mmol) and Boc-Py-O(Oxyma) (77 mg and 0.2 mmol), and the mixture was reacted at 37° C. for 24 hours. Acetonitrile (6 mL) was added to the reaction solution, and the resulting precipitate was collected by filtration and dried under reduced pressure to obtain the target product as a concentrate (223 mg, 0.18 mmol, yield: 91.7%).

Example 22: Production of Boc-Py-Im-(β-Ala)-Dp Referred to as Pyrrole-Imidazole (Poly)Amide Represented by Formula (6-G) by Solid-Phase Synthesis Method After Boc-(β-Ala)-PAM resin (referred to as PAM resin bound by N-(t-butoxycarbonyl)-β-alanine represented by the formula (1-F-1); 400 mg, 0.3 mmol/g, 0.12 mmol) was swollen with DMF (8 mL) for 3 hours, the solution was filtered and washed with 8 mL of dichloromethane, and this procedure was repeated three times. Then, 4 mL of a mixture of trifluoroacetic acid (hereinafter referred to as TFA)/phenol/$H_2O$=92.5/5.0/2.5 by weight was added for de-Boc reaction for 30 minutes. This procedure was repeated twice. After the solution was filtrated, the solution was washed with dichloromethane (8 mL) three times and then N-methylpyrrolidone (hereinafter referred to as NMP; 8 mL) three times. An NMP solution of Boc-Im-OOBt (referred to as aminoimidazole carboxylic acid derivative represented by the formula (1-F-2); 309 mg, 0.8 mmol) and DIPEA (155 mg, 1.2 mmol) was separately prepared, added to a reaction vessel filled with the resin, and shaken at 25° C. for 18.5 hours. After the reaction solution was filtrated, the residue was washed with NMP (8 mL) three times, and then dichloromethane (8 mL) three times. Then 4 mL of TFA/phenol/$H_2O$=92.5/5.0/2.5 by weight was added for de-Boc reaction for 30 minutes, and this procedure was repeated two times. After the solution was filtrated, the residue was washed with dichloromethane (8 mL) three times and dried under reduced pressure to obtain 446 mg of the resin containing the aminoimidazole carboxylic acid derivative represented by the formula (1-F). After 140 mg of the obtained resin represented by the formula (1-F) was swollen with dichloromethane and the solution was filtered, the separately prepared pyridine solution of Boc-Py-O(Oxyma) (58 mg, 0.16 mmol) and NMM (24 mg, 0.24 mmol) was added to the reaction vessel, and the mixture was shaken at 25° C. for 12 hours. After the reaction solution was filtrated, the residue was washed with pyridine (4 mL) three times and dichloromethane (4 mL) three times. The obtained resin bound by pyrrole-imidazole (poly)amide was dried under reduced pressure, 1 mL of 3-(dimethylamino)-1-propylamine (hereinafter referred to as Dp) was added, and the mixture was stirred at 55° C. for 21 hours. After the PAM resin was removed by filtration, the filtrate was concentrated under reduced pressure at 45° C. to remove Dp in order to obtain the target product as a concentrate (19 mg, 0.036 mmol, yield: 94.9%).

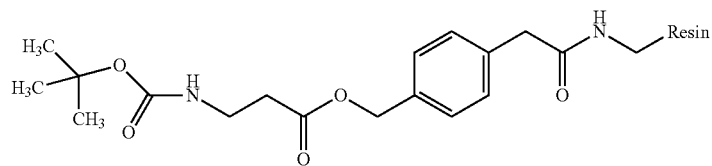

(1-F-1)

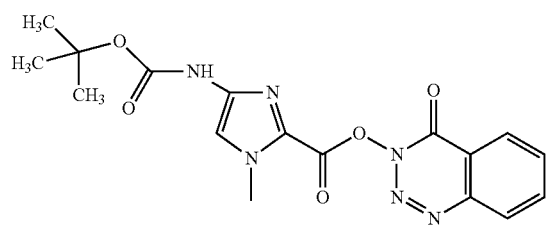

(1-F-2)

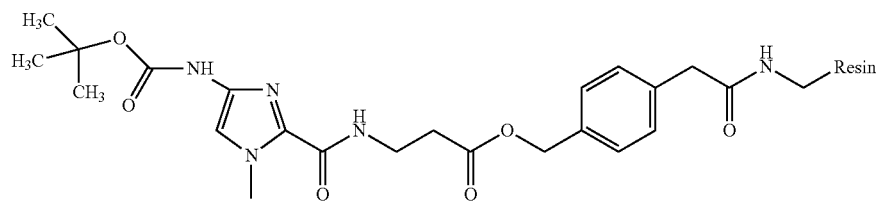

(1-F)

Example 23: Production of Ac-Py-Im-(β-Ala)-Dp Referred to as Pyrrole-Imidazole (Poly)Amide Represented by Formula (6-H) by Solid-Phase Synthesis Method After Fmoc-(β-Ala)-Wang resin (referred to as Wang resin bound by N-(9-fluorenylmethyloxycarbonyl)-β-alanine represented by the formula (1-G-1); 227 mg, 0.66 mmol/g, 0.15 mmol) was swollen with dichloromethane (5 mL) for 2 hours, the solution was filtrated and the residue was washed with 5 mL of NMP, and this procedure was repeated three times. Then, 8 mL of a 20% piperidine/NMP solution was added for de-Fmoc reaction for 90 minutes. After the filtration, the residue was washed with NMP (3 mL) five times, and then the separately prepared NMP solution of 4-[(9-fluorenylmethoxycarbonyl)amino]-1-methylimidazole-2-carboxylic acid (218 mg, 0.6 mmol), N,N-diisopropylcarbodiimide (76 mg, 0.6 mmol) and Oxyma (85 mg, 0.6 mmol) was added to a reaction vessel, and the mixture was shaken at 25° C. for 19.5 hours. After the reaction solution was filtrated, the residue was washed with NMP (3 mL) five times. Subsequently, 20% piperidine/NMP solution (8 mL) was added for de-Fmoc reaction for 90 minutes. After the solution was filtrated, the residue was washed with NMP (3 mL) five times, dichloromethane (3 mL) three times, and then dried under reduced pressure to obtain 218 mg of the resin having an aminoimidazole carboxylic acid derivative. Among the obtained resin, 62 mg (0.05 mmol) was preliminarily swollen with dichloromethane, and then washed with pyridine (3 mL) five times. Subsequently, the separately prepared pyridine solution of Fmoc-Py-OAt (96 mg, 0.2 mmol) and DIPEA (39 mg, 0.3 mmol) was added to the reaction vessel, and the mixture was shaken at 25° C. for 17 hours. After the reaction liquid was filtrated, the residue was washed with NMP (3 mL) five times. An NMP solution of acetic anhydride (51 mg, 0.5 mmol) and DIPEA (65 mg, 0.5 mmol) was added, and the mixture was shaken at room temperature for 4 hours. After removing the reaction solution by filtration, the mixture was washed 5 times with 3 mL of NMP. After the reaction solution was filtered, the residue was washed with NMP (3 mL) five times and dichloromethane (3 mL) three times, and dried under reduced pressure to obtain 70 mg of the resin bound by pyrrole-imidazole (poly)amide. Subsequently, 0.3 mL of Dp was added, and the mixture was stirred at 55° C. for 29 hours. After the Wang resin was removed by filtration, the filtrate was concentrated under reduced pressure at 45° C. to remove Dp in order to obtain the target product as a concentrate (21 mg, 0.045 mmol, yield: 92.2%).

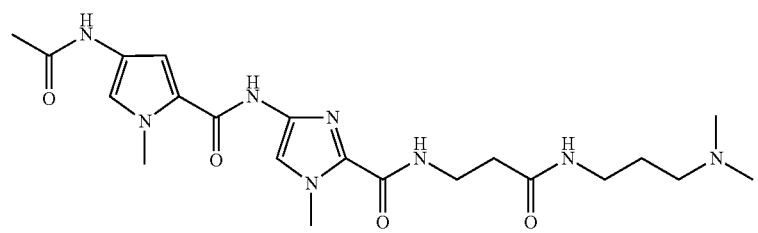

(6-H)

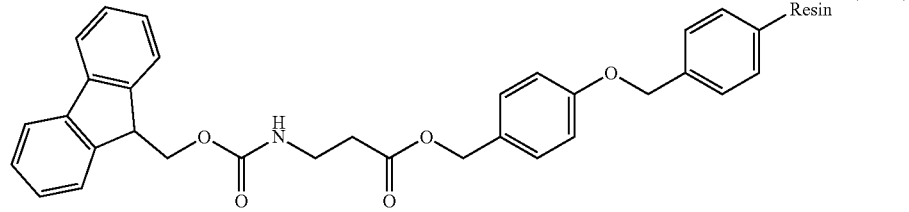

(1-G-1)

The invention claimed is:

1. A method for producing a pyrrole-imidazole (poly) amide, comprising the steps of reacting a compound represented by the following formula (1):

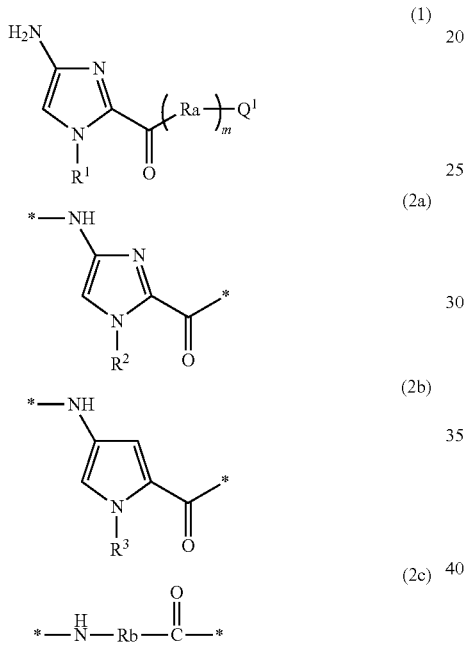

wherein in the formula (1),

Ra is a (poly)amide organic group having 1 or more and 3 or less kinds of a unit selected from the units represented by the formulas (2a), (2b), and (2c) as a constituent unit, wherein a total number of the constituent unit is 1 or more and 30 or less, $Q^1$ is a carrier, or an amino group optionally having a hydroxy group, an organic group, or a substituent, wherein the carrier is either a solid-phase carrier or a soluble carrier, the solid-phase carrier is a resin solid-phase carrier, and the soluble carrier is at least one selected from the group consisting of 3,4,5-tri(n-octadecyloxy)benzyl alcohol, 3,5-di(docosyloxy)benzyl alcohol, 2,4-di(docosyloxy)benzyl alcohol, and 2-[12-(docosyloxy) dodecyloxy]-9-(3-fluorophenyl)-9-bromofluorene, and wherein the organic group is a $C_{1-12}$ alkoxy group optionally having a substituent, a $C_{2-12}$ alkenyloxy group optionally having a substituent, a $C_{6-12}$ aryloxy group optionally having a substituent, or a $C_{7-12}$ aralkyloxy group optionally having a substituent, m is 0 or 1, $R^1$ to $R^3$ independently represent a $C_{1-12}$ alkyl group, when the compound represented by the formula (1) has a plurality of units represented by the formula (2a), a plurality of $R^2$ may be the same as or different from each other, when the compound represented by the formula (1) has a plurality of units represented by the formula (2b), a plurality of $R^3$ may be the same as or different from each other, Rb represents a $C_{1-10}$ alkylene group wherein the alkylene group may be bonded with one or more groups selected from an amino group having a substituent, a $C_{1-12}$ alkoxy group optionally having a substituent, a $C_{2-12}$ alkenyloxy group optionally having a substituent, a $C_{6-12}$ aryloxy group optionally having a substituent, and a $C_{7-12}$ aralkyloxy group optionally having a substituent, when the compound represented by the formula (1) has a plurality of units represented by the formula (2c), a plurality of Rb may be the same as or different from each other, wherein the substituent that may be present in the $C_{1-12}$ alkoxy group, $C_{2-12}$ alkenyloxy group, $C_{6-12}$ aryloxy group, and $C_{7-12}$ aralkyloxy group is a nitro group, a nitrile group, or a halogen atom, and wherein the substituent that may be present in the amino group is a $C_{1-12}$ alkyl group, a $C_{2-12}$ alkenyl group, a $C_{7-12}$ aralkyl group, or a $C_{6-12}$ aryl group, wherein the alkyl group, alkenyl group, aralkyl group, and aryl group may optionally have a $C_{1-12}$ alkylamino group bonded thereto, represents a bond, with a compound represented by the following formula (3):

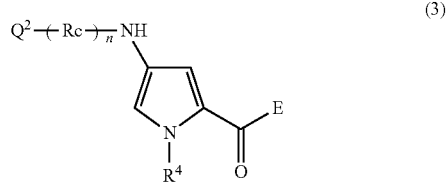

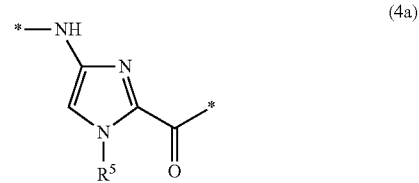

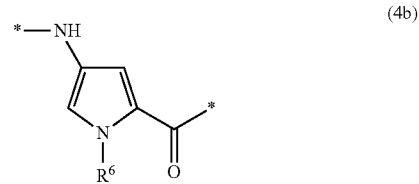

-continued

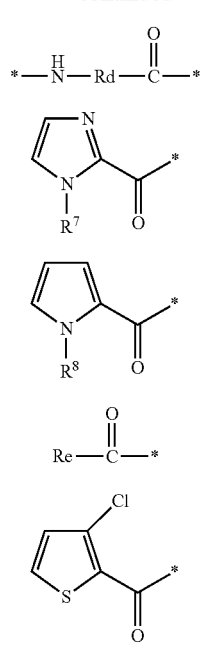

wherein in the formula (3),

Rc is a (poly)amide organic group having 1 or more and 3 or less kinds of the unit selected from the units represented by the formulas (4a), (4b), and (4c) as a constituent unit and the total number of the constituent unit is 1 or more and 30 or less, $Q^2$ is a protective group of an amino group, or a group represented by the formulas (5a), (5b), (5c) or (5d), E is a leaving group, n is 0 or 1, $R^4$ to $R^8$ each independently represents a $C_{1-12}$ alkyl group, when the compound represented by the formula (3) has a plurality of units represented by the formula (4a), a plurality of $R^5$ may be the same as or different from each other, when a compound represented by the formula (3) has a plurality of units represented by the formula (4b), a plurality of $R^6$ may be the same as or different from each other, Rd represents a $C_{1-10}$ alkylene group wherein the alkylene group may be bonded with one or more groups selected from an amino group having a substituent, a $C_{1-12}$ alkoxy group optionally having a substituent, a $C_{2-12}$ alkenyloxy group optionally having a substituent, and a $C_{6-12}$ aryloxy group optionally having a substituent, and a $C_{7-12}$ aralkyloxy group optionally having a substituent, when a compound represented by the formula (3) has a plurality of units represented by the formula (4c), a plurality of Rd may be the same as or different from each other, Re represents a $C_{1-10}$ alkyl group wherein the alkyl group may be bonded with one or more groups selected from an amino group having a substituent, a $C_{1-12}$ alkoxy group optionally having a substituent, a $C_{2-12}$ alkenyloxy group optionally having a substituent, a $C_{6-12}$ aryloxy group optionally having a substituent, and a $C_{7-12}$ aralkyloxy group optionally having a substituent, wherein the substituent that may be present in the $C_{1-12}$ alkoxy group, $C_{2-12}$ alkenyloxy group, $C_{6-12}$ aryloxy group, and $C_{7-12}$ aralkyloxy group is a nitro group, a nitrile group, or a halogen atom, and wherein the substituent that may be present in the amino group is a $C_{1-12}$ alkyl group, a $C_{2-12}$ alkenyl group, a $C_{7-12}$ aralkyl group, or a $C_{6-12}$ aryl group, wherein the alkyl group, alkenyl group, aralkyl group, and aryl group may optionally have a $C_{1-12}$ alkylamino group bonded thereto, represents a bond, in the presence of a heterocyclic aromatic compound as a solvent to produce the pyrrole-imidazole (poly)amide represented by the following formula (6):

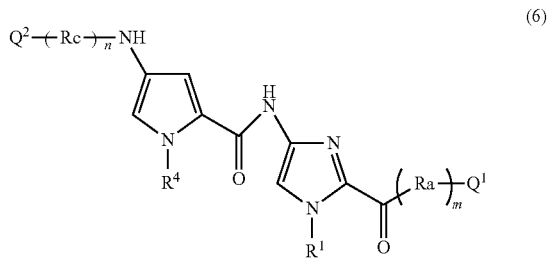

wherein in the formula (6), Ra, Rc, $Q^1$, $Q^2$, $R^1$, $R^4$, m and n are the same as described above, wherein the reaction between the compound represented by the formula (1) and the compound represented by the formula (3) is carried out in the presence of a tertiary amine.

2. The production method according to claim 1, further comprising the steps of:

reacting a pyrrolecarboxylic acid represented by the following formula (3)':

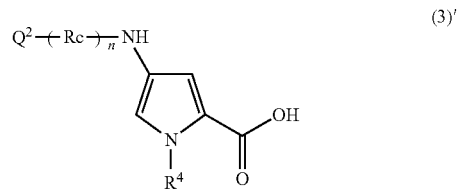

wherein in the formula (3)', Rc, $Q^2$, n, and $R^4$ are the same as described above, with 1-hydroxybenzotriazole, 3,4-dihydro-3-hydroxy-4-oxo-1,2,3-benzotriazine, 1-hydroxy-7-azabenzotriazole, N-hydroxysuccinimide, cyano (hydroxyimino)ethyl acetate, pentafluorophenol, or 1-ethyl-3-(3-dimethylaminopropyl) carbodiimide, to obtain the compound represented by the formula (3); and isolating the obtained compound represented by the formula (3), wherein the isolated compound represented by the formula (3) is reacted with the compound represented by the formula (1).

3. The production method according to claim 1, wherein the E is any one of the following formulas (31) to (36):

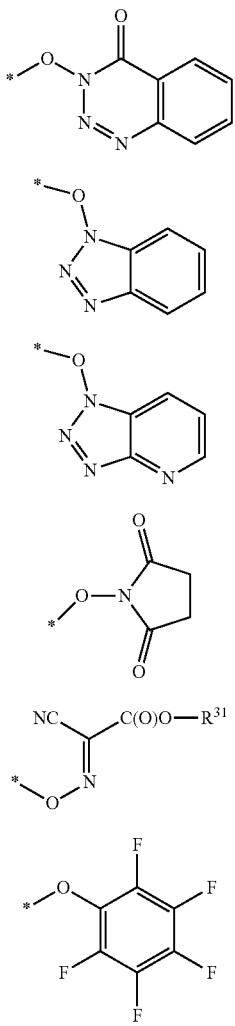

wherein in the formulas, $R^{31}$ represents a $C_{1-5}$ alkyl group, and * represents a bond.

4. The production method according to claim 1, wherein the compound represented by the formula (1) is a compound represented by the following formula (1-1):

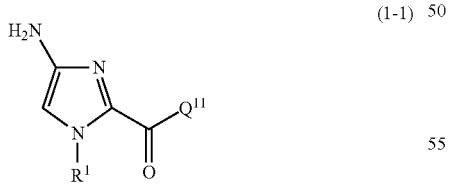

in the formula (1-1), $R^1$ is the same as described above, and $Q^{11}$ represents a soluble carrier, a hydroxy group, a $C_{1-12}$ alkoxy group optionally having a substituent, a $C_{2-12}$ alkenyloxy group optionally having a substituent, a $C_{6-12}$ aryloxy group optionally having a substituent, a $C_{7-12}$ aralkyloxy group optionally having a substituent, or an amino group optionally having a substituent, wherein the soluble carrier is at least one selected from the group consisting of 3,4,5-tri(n-octadecyloxy)benzyl alcohol, 3,5-di(docosyloxy)benzyl alcohol, 2,4-di(docosyloxy)benzyl alcohol, and 2-[12-(docosyloxy)dodecyloxy]-9-(3-fluorophenyl)-9-bromofluorene, wherein the substituent that may be present in the $C_{1-12}$ alkoxy group, $C_{2-12}$ alkenyloxy group, $C_{6-12}$ aryloxy group, or $C_{7-12}$ aralkyloxy group is a nitro group, a nitrile group, or a halogen atom, and wherein the substituent that may be present in the amino group is a $C_{1-12}$ alkyl group, a $C_{2-12}$ alkenyl group, a $C_{7-12}$ aralkyl group, or a $C_{6-12}$ aryl group, wherein the alkyl group, alkenyl group, aralkyl group, and aryl group may optionally have a $C_{1-12}$ alkylamino group bonded thereto.

5. The production method according to claim 1, wherein the tertiary amine is an amine represented by the following formula (a):

wherein in the formula (a), $R^{a1}$ represents a $C_{1-8}$ linear alkyl group, $R^{a2}$ to $R^{a3}$ independently represents a $C_{3-10}$ branched alkyl group, a $C_{4-8}$ linear alkyl group, or $R^{a2}$ and $R^{a3}$ are connected together to form a $C_{3-10}$ saturated ring with the nitrogen atom bound to $R^{a2}$ and $R^{a3}$, wherein the methylene group in the $C_{3-10}$ saturated ring may be replaced with an oxygen atom or —CO—.

6. The production method according to claim 1, wherein the tertiary amine is diisopropylethylamine, tributylamine, or N-methylmorpholine.

* * * * *